US007648666B2

(12) United States Patent
Everett

(10) Patent No.: US 7,648,666 B2
(45) Date of Patent: Jan. 19, 2010

(54) METHOD OF FORMING BUILDING BLOCKS USING BLOCK PRESS EQUIPMENT HAVING TRANSLATING FLUID INJECTION APPARATUS

(76) Inventor: Steve Eugene Everett, 1619 Wheless La., Austin, TX (US) 78723

( * ) Notice: Subject to any disclaimer, the term of this patent is extended or adjusted under 35 U.S.C. 154(b) by 0 days.

(21) Appl. No.: 12/283,682

(22) Filed: Sep. 15, 2008

(65) Prior Publication Data

US 2009/0152765 A1 Jun. 18, 2009

Related U.S. Application Data

(63) Continuation-in-part of application No. 12/001,970, filed on Dec. 13, 2007.

(51) Int. Cl.

| | |
|---|---|
| ***B27N 3/18*** | (2006.01) |
| ***B28B 3/00*** | (2006.01) |
| ***B28B 3/02*** | (2006.01) |
| ***B29C 41/46*** | (2006.01) |
| ***B29C 43/02*** | (2006.01) |
| ***B29C 43/32*** | (2006.01) |
| ***B29C 51/00*** | (2006.01) |
| ***D04H 1/64*** | (2006.01) |
| ***B29C 33/00*** | (2006.01) |
| ***B29B 7/00*** | (2006.01) |
| ***B29C 45/00*** | (2006.01) |
| ***B28B 5/00*** | (2006.01) |
| *A23P 1/00* | (2006.01) |
| *B29B 11/06* | (2006.01) |
| *B29C 35/00* | (2006.01) |
| *A23G 3/12* | (2006.01) |
| *A23G 3/16* | (2006.01) |
| *B21C 3/00* | (2006.01) |
| *A23G 1/20* | (2006.01) |
| *B23B 19/00* | (2006.01) |
| *B23B 23/00* | (2006.01) |
| *B28B 17/00* | (2006.01) |

(52) U.S. Cl. ....................... 264/319; 264/128; 264/240; 264/328.7; 264/328.8; 264/328.11; 264/DIG. 59; 264/228; 425/574; 425/575; 425/128; 425/146; 425/233

(58) Field of Classification Search ....................... None
See application file for complete search history.

(56) References Cited

U.S. PATENT DOCUMENTS

| | | | |
|---|---|---|---|
| 266,532 | A | 10/1882 | Ross |
| 435,171 | A | 8/1890 | Davis et al. |
| 3,225,409 | A | 12/1965 | Huffaker |

(Continued)

FOREIGN PATENT DOCUMENTS

| | | |
|---|---|---|
| EP | 1395525 | 3/2004 |

*Primary Examiner*—Christina Johnson
*Assistant Examiner*—Benjamin Schiffman
(74) *Attorney, Agent, or Firm*—David O. Simmons

(57) ABSTRACT

In one embodiment of the present invention, a method comprises a plurality of operations. An operation is performed for depositing a quantity of article-forming media within a media receiving cavity of article forming equipment. After depositing at least a portion of the article-forming media within the media receiving cavity, an operation performed for depositing a volume of a prescribed fluid into the media receiving cavity. Depositing the prescribed fluid includes moving a first fluid delivery device through the quantity of the article-forming media while injecting the prescribed fluid through the first fluid delivery device into the quantity of the article-forming media.

17 Claims, 16 Drawing Sheets

U.S. PATENT DOCUMENTS

| | | | | |
|---|---|---|---|---|
| 4,640,671 | A | 2/1987 | Wright | |
| 5,358,760 | A | 10/1994 | Furlong et al. | |
| 6,224,359 | B1 | 5/2001 | Domazet | |
| 6,558,589 | B1 * | 5/2003 | Bergman | 264/40.5 |
| 6,878,319 | B2 * | 4/2005 | Browne et al. | 264/71 |
| 6,736,626 | B1 | 5/2005 | Lienau | |
| 2002/0105107 | A1 | 8/2002 | Everett | |
| 2004/0055510 | A1 * | 3/2004 | Kurple et al. | 106/640 |
| 2005/0025853 | A1 | 2/2005 | Ness | |
| 2005/0046083 | A1 * | 3/2005 | Dewar et al. | 264/328.1 |
| 2006/0208386 | A1 * | 9/2006 | Everett et al. | 264/109 |

* cited by examiner

METHOD OF FORMING BUILDING BLOCKS USING BLOCK PRESS EQUIPMENT HAVING TRANSLATING FLUID INJECTION APPARATUS

CROSS REFERENCE TO RELATED APPLICATIONS

This patent application is a Continuation-In-Part patent application of United States patent application having Ser. No. 12/001,970, filed on Dec. 13, 2007, entitled "Method and System for Forming Structural Building Blocks Having A Cured Binding Material Therein", having a common applicant herewith and being incorporated herein in its entirety by reference.

FIELD OF THE DISCLOSURE

The disclosures made herein relate generally to structural building blocks and, more particularly, to methods and equipment configured for fabricating structural building blocks comprising a curable binding material in compressed combination with organic chafe, soil, clay, aggregate materials and/or the like.

BACKGROUND

The formation of building blocks from compaction of materials such as, for example, soil, clay and/or aggregate is a well-known process utilized throughout the world. These types of structural building blocks are commonly and generically referred to as adobe blocks. Throughout the years, various applications designed to automate this process have been produced. Examples of known equipment configured specifically or similarly for fabricating building blocks by compaction of materials (i.e., conventional building block fabrication equipment) are disclosed in U.S. Pat. Nos. 266,532; 435,171; 3,225,409, 4,640,671, 5,358,760 and 6,224,359.

Such known building block fabrication equipment is known to suffer from one or more drawbacks. One such drawback is that they involve relatively complex mechanical procedures that adversely effect productivity in the number of blocks fabricated in a particular period of time and/or portability of the equipment itself. Another drawback is that they are limited in their ability to readily and efficiently produce building blocks of different sizes and/or shapes. Still another drawback is that they do not readily allows for two or more systems to be joined and operated simultaneously or independently, while maintaining easy access to replaceable components.

In addition to drawbacks associated with known building block fabrication equipment, structural building blocks whose physical integrity depends on compaction are known to exhibit shortcomings. Structural building blocks that rely solely on compaction for physical integrity often degrade over time as a result of aging and/or environmental conditions. Furthermore, such compaction is often positively or adversely impacted by variables such as, for example, moisture content of the compacted materials, natural degradation of the constituent organic materials and the like. Compressive forces applied to the building blocks during use of such structural building blocks can also exceed their load carrying capabilities. The result of the load carrying capability being exceeded resulting in cracking and/or crushing of such structural building blocks, which is aesthetically unappealing and impairs the structural integrity of the building structure made using such building blocks.

Therefore, fabricating structural building blocks in a manner that overcomes drawbacks and shortcomings associated with known methods and block fabricating equipment would be useful, advantageous and novel.

SUMMARY OF THE DISCLOSURE

Embodiments of the present invention relate to block fabricating methods and equipment that are configured in a manner that overcomes drawbacks and shortcomings associated with known block fabricating methods and equipment. More specifically, methods and equipment configured in accordance with the present invention utilize a curable binding material for enhancing physical integrity of compacted block-forming media and a translating activation material delivery device for enhancing dispersion and distribution of an activation material that reacts with the curable binding material. Curing of the curable binding material is initiated in conjunction with compaction of the block-forming media within a media receiving cavity of the block forming equipment. To this end, structural building blocks fabricated in accordance with the present invention offer improved performance relative to structural building blocks fabricated using prior art approaches. Furthermore, block fabricating equipment configured in accordance with the present invention allows a structural building block having a cured binding material dispersed within block forming media thereof to be made in a relatively fast, simple and uniform manner.

In one embodiment of the present invention, a method comprises a plurality of operations. An operation is performed for depositing a quantity of article-forming media within a media receiving cavity of article forming equipment. After depositing at least a portion of the article-forming media within the media receiving cavity, an operation is performed for depositing a volume of a prescribed fluid into the media receiving cavity. Depositing the prescribed fluid includes moving a first fluid delivery device through the quantity of the article-forming media while injecting the prescribed fluid through the first fluid delivery device into the quantity of the article-forming media.

In another embodiment of the present invention, a method of forming building blocks comprises a plurality of operations. An operation is performed for facilitating relative positioning of a compression case and two opposed compression bodies movably mounted within a compression body receiving passage of the compression case for forming a media receiving cavity within the compression body receiving passage between the compression bodies. After performing such relative positioning, an operation is performed for depositing a quantity of block-forming media within the media receiving cavity. The block-forming media includes a curable binding material dispersed therein and curing of the curable binding material is caused by contact with a prescribed activation material. An operation is performed for providing relative positioning of the compression case for closing an entry into the media receiving cavity through which the quantity of block-forming media was deposited after the quantity of block-forming media is deposited within the media receiving cavity. Thereafter an operation is performed for depositing a quantity of the prescribed activation material into the media receiving cavity. Depositing of the prescribed activation material includes moving a first activation material delivery device through the quantity of the block-forming media while injecting the prescribed activation material through the first activation material delivery device into the quantity of the block-forming media. After or during depositing of the quantity of the prescribed activation material, an operation is performed for moving at least one of the compression bodies toward the other one of the compression bodies under sufficient force to compress the block-forming media into a building block. Such moving is initiated one of during depositing of the prescribed activation material and upon completion of depositing the prescribed activation material.

In another embodiment of the present invention, block fabricating equipment such as a block press comprises a plurality of block press structures and a fluid delivery device. The plurality of block press structures are jointly configured for forming a media receiving cavity. The media receiving cavity is capable of having a quantity of block-forming media deposited therein. The fluid delivery device is configured for depositing a quantity of a prescribed fluid into the media receiving cavity after depositing at least a portion of the block-forming media within the media receiving cavity. The fluid delivery device extends through opposing block press structure walls defining the media receiving cavity and is configured for injecting the prescribed fluid into the media receiving cavity through a delivery orifice thereof while the fluid delivery device is being moved through the media receiving cavity. The delivery orifice is within the media receiving cavity during the injection.

In another embodiment of the present invention, block fabricating equipment comprising a plurality of block press structures and means for depositing a quantity of a prescribed fluid. The plurality of block press structures are jointly configured for forming a media receiving cavity. The media receiving cavity is capable of having a quantity of block-forming media deposited therein. The means for depositing the quantity of the prescribed fluid into the media receiving cavity is configured for doing so after depositing at least a portion of the block-forming media within the media receiving cavity. Depositing of the prescribed fluid includes moving a fluid delivery device through the media receiving cavity while injecting the prescribed fluid through the fluid delivery device into the media receiving cavity.

These and other objects, embodiments advantages and/or distinctions of the present invention will become readily apparent upon further review of the following specification, associated drawings and appended claims.

DETAILED DESCRIPTION OF THE DRAWING FIGURES

Figure 1:
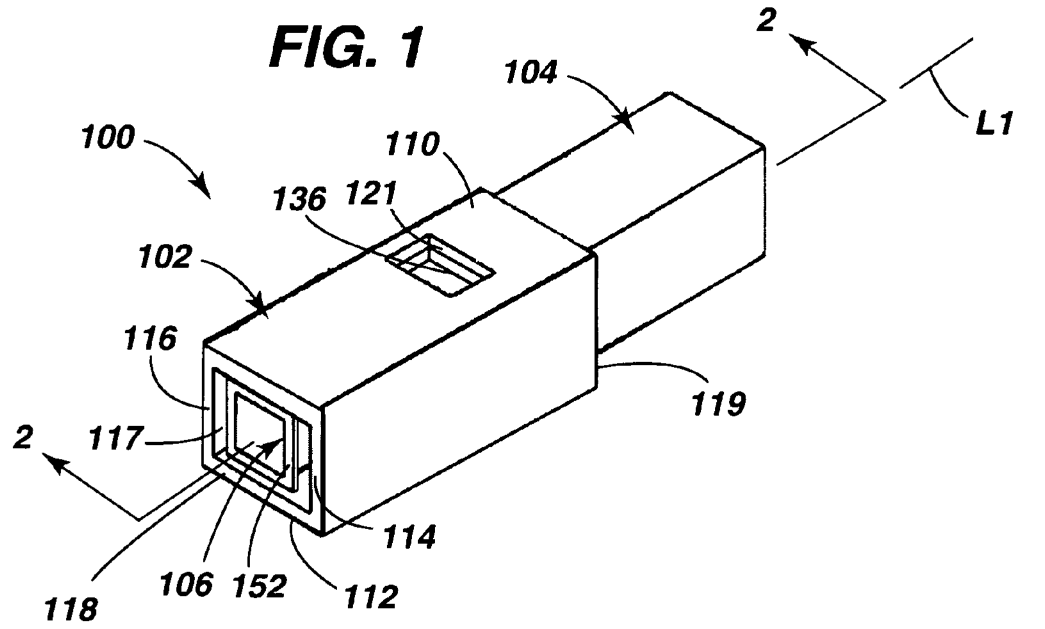
FIG. 1 depicts a block forming apparatus in accordance with a first embodiment the present invention, which is configured for forming structural building blocks by compacting block forming media.
Figure 2:
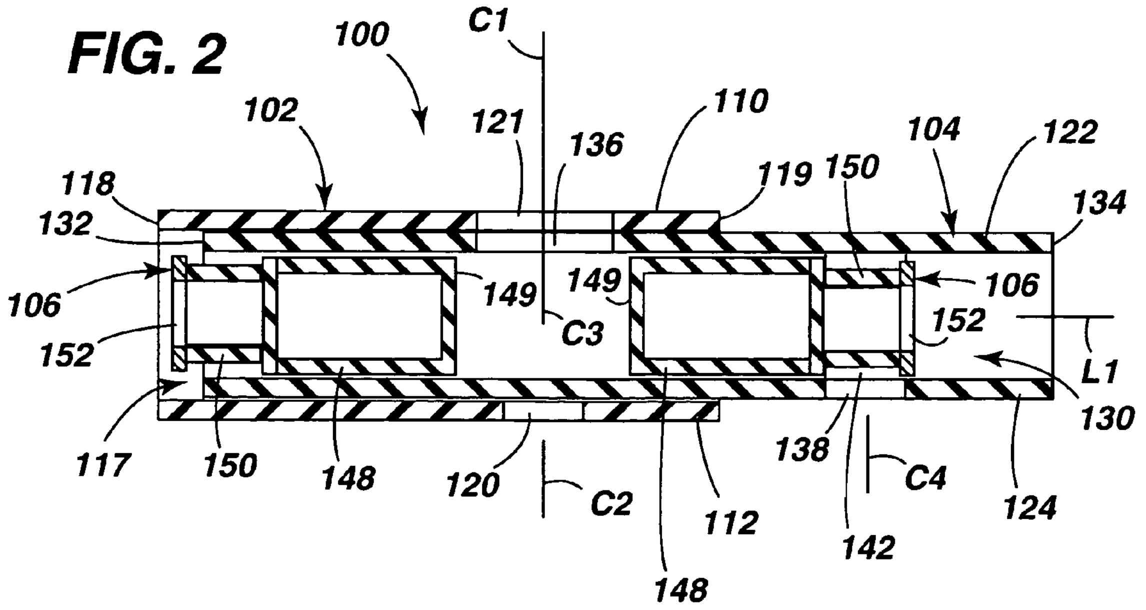
FIG. 2 is a cross-sectional view taken along the line 2-2 in FIG. 1.
Figure 3:
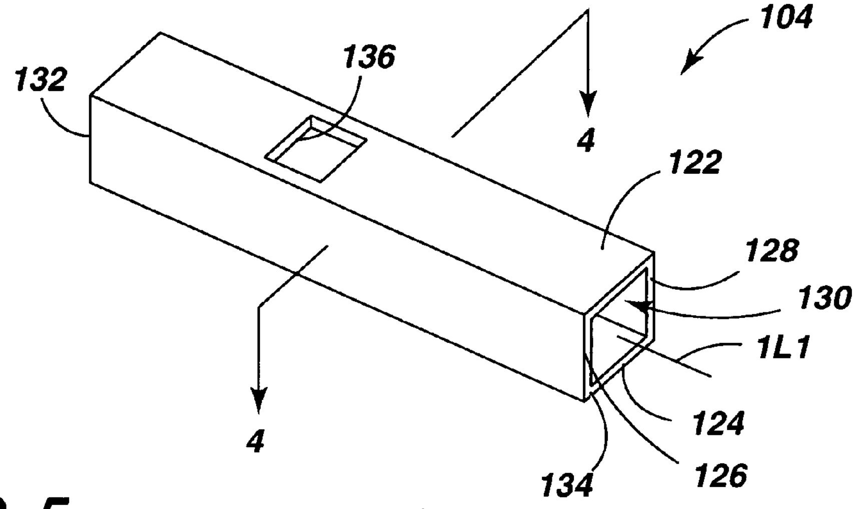
FIG. 3 is a perspective view showing a compression case of the block forming apparatus depicted in FIG. 1.

FIGS. 1 and 2 show a block forming apparatus 100 in accordance with an embodiment of the present invention. The block forming apparatus 100 is configured for forming structural building blocks by compacting block forming media. The block forming apparatus 100 includes a frame 102, a compression case 104 and two opposed compression bodies 106. As is discussed in greater detail below, the frame 102, the compression case 104 and the two opposed compression bodies 106 are configured and interoperable in a manner that enabling the block forming apparatus 100 to carry out block fabrication functionality in accordance with present invention (e.g., in accordance with the method 200 disclosed herein).

As will become apparent in the ensuing discussion, the block forming apparatus 100 advantageously has a substantially integrated construction such that can be readily implemented into a block press having a substantially modular construction (i.e., the block forming apparatus 100 is a component of such modular construction). Alternatively, the block forming apparatus 100 can be implemented in a block press in a non-modular and/or non-interchangeable manner. Additionally, the block press apparatus 100 can be used in a block press configured for having a single block press apparatus mounted thereon at any point in time or a plurality of block press apparatuses mounted thereon at any point in time.

In the depicted embodiment, the frame 102 is preferably, but not necessarily, an elongated rectangular cross-section tube having an upper wall 110, a lower wall 112 and spaced apart side walls (114, 116). The frame 102 includes compression case receiving passage 117 defined by interior surfaces of the walls (110-116) of the frame 102. The compression case receiving passage 117 extends between opposed end faces (118, 119) of the frame 102.

A media fill opening 121 extends through the upper wall 110 of the frame 102 and a block discharge opening 120 extends through the lower wall 112 of the frame 102 such that the media fill opening 121 and the block discharge opening 120 are communicative with the compression case receiving passage 117. Preferably, but not necessarily, a central axis C1 of the media fill opening 121 is aligned with a central axis C2 of the block discharge opening 120 (FIG. 2). It is disclosed herein that the central axes (C1, C2) of the media fill opening 121 and the block discharge opening 120 need not be fully aligned with each other.

Referring now to FIGS. 1-4, the compression case 104 is slideably engaged within the compression case receiving passage 117 of the frame 102. The slideable engagement between the frame 102 and the compression case 104 enables movement of the compression case 104 relative to the frame 102 along a longitudinal reference axis L1 of the compression case 104. In the depicted embodiment, the compression case 104 is preferably, but not necessarily, an elongated rectangular cross-section tube having an upper wall 122, a lower wall 124 and spaced apart side walls (126, 128). Interior surfaces of the walls (122-128) of the compression case 104 define a compression body receiving passage 130 (FIGS. 2 and 4) extending between opposed end faces (132, 134) of the compression case 104 along the longitudinal reference axis L1. A media fill opening 136 extends through the upper wall 122 of the compression case 104 and a block discharge opening 138 extends through the lower wall 124 of the compression case 104. The media fill opening 136 of the compression case 104 and the block discharge opening 138 of the compression case 104 are communicative with the compression body receiving passage 130.

The respective interior surface of each one of the side walls (126, 128) has a respective block release recess (140, 142) therein. The block release recesses (140, 142) extending between the upper wall 122 and the lower wall 124. The block release recesses (140, 142) are positioned between a forward lateral edge 144 of the block discharge opening 138 and a rear lateral edge 146 of the block discharge opening 138. Preferably, a width of each one of the block release recess (140, 142) is the same as a length of the block discharge opening 138. A central axis C3 of the media fill opening 136 of the compression case 104 is offset from a central axis C4 of the block discharge opening 138 of the compression case 104.

At a minimum, the central axis C3 of the media fill opening 136 of the compression case 104 is offset from the central axis C4 of the block discharge opening 138 by a distance equal to a length of the media fill opening 136 of the compression case 104. It is disclosed herein that, in an alternate embodiment of the compression case 103 (not shown), the block discharge opening 138 intersects adjacent end 134 of the compression case 104. In such an alternate embodiment, the adjacent end 134 of the compression case 104 defines the rear lateral edge 146 of the block discharge opening 138.

Preferably, dimensions of the block discharge opening 120 of the frame 102 are the same as or larger than the corresponding dimensions of the block discharge opening 138 of the compression case 104. Similarly, it is preferable that dimensions of the media fill opening 121 of the frame 102 are the same as or larger than the corresponding dimensions of the media fill opening 138 of the compression case 104.

It is disclosed herein that the frame 102 and the compression case 104 can optionally both have a different cross sectional shape than rectangular. Examples of such different cross-sectional shapes include, but are not limited to, round, hexagonal, etc. In view of the disclosures made herein, a skilled person will appreciate that the present invention is not necessarily limited to a particular cross-sectional shape of the frame 102 or the compression case 104. Additionally, a skilled person will appreciate that the frame 102 can be a non-tubular structure (e.g., an open chassis) while still providing for the required functionality of movable engagement with the compression case 104 and necessary engagement of the block forming apparatus 100 by a block press.

Figure 5:
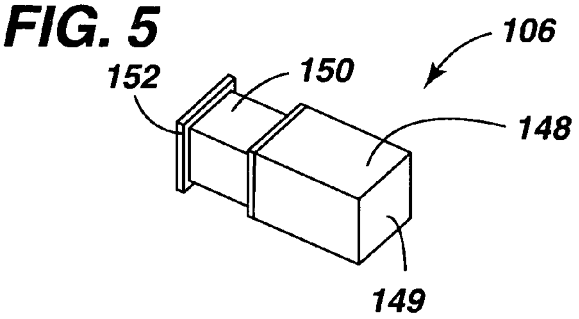
FIG. 5 is a perspective view showing a compression body of the block forming apparatus depicted in FIG. 1.
Figure 4:
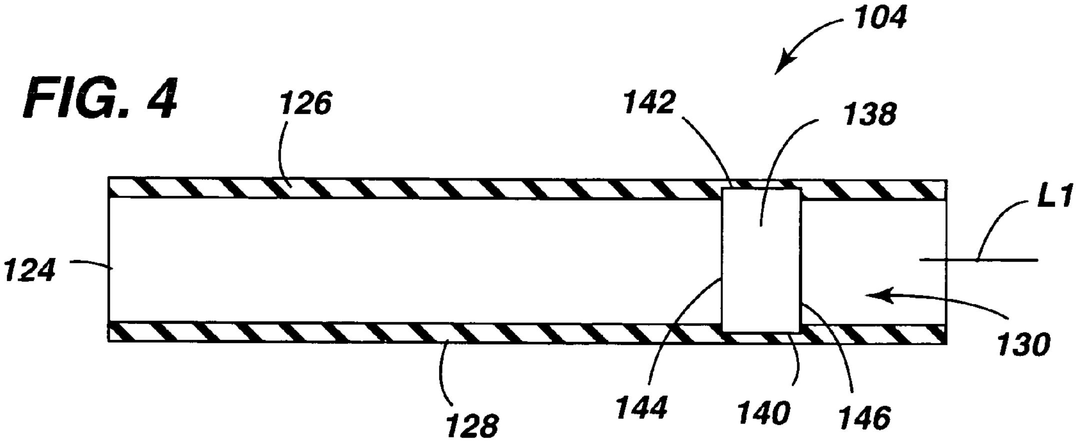
FIG. 4 is a cross-sectional view taken along the line 4-4 in FIG. 3.

Referring now to FIGS. 1, 2 and 5, each compression body 106 is slideably mounted within the compression body receiving passage 130 of the compression case 104. Thus, each compression body 106 is mounted in a manner enabling movement (i.e., simultaneous, independent and/or linked) of each compression body 106 along the longitudinal reference axis L1 of the compression case 104. In the depicted embodiment, each compression body 106 has a media compaction portion 148 and an actuator engagement portion 150 connected to the media compaction portion 148. An inboard face 149 of the media compaction portion 148 can be substantially flat, can be partially flat with a non-flat feature or can be substantially contoured. The media compaction portion 148 of each compression body 106 has a relatively low clearance fit (i.e., an intimate fit) within the compression body receiving passage 130 and, preferably, a length of the media compaction portion 148 is relatively long with respect to cross-sectional dimensions of the compression body receiving passage 130 to limit a tendency for rocking within compression body receiving passage 130. The actuator engagement portion 150 includes a generally flat engagement flange 152. The engagement flange enables distributed delivery of a force onto the compression body 106 through a force application means such as, for example, a force application platen connected to a hydraulic cylinder.

Preferably, but not necessarily, the actuator engagement portion 150 of each compression body 106 is sized to provide a relatively large clearance between perimeter edges thereof and the interior surfaces of the walls (122-128) of the compression body 104. Optionally, all of the actuator engagement portion 150 of each compression body 106 or a portion of the actuator engagement portion 150 of each compression body 106 can have a relatively low clearance fit with the compression body receiving passage 130. Additionally, it is disclosed herein that the media compaction portion 148 of each compression body 106 can consist of a flat plate attached to the actuator engagement portion 150, such that the compression body essentially includes two flat plates having a rigid member (e.g., a steel tube) connected therebetween. Additionally, one or more other flat plates serving as intermediate support ribs can be attached to the rigid member at locations between the ends of the rigid member.

A skilled person will recognize that the various components of a block press in accordance with the present invention will preferably be made from suitably strong, rigid and durable materials. For example, in view of the disclosures made herein, it will be appreciated that a frame, a compression case and compression bodies in accordance with the present invention will preferably be made from one or a collection of pieces (e.g., welded, fastened with threaded fasteners, etc) of a hardened steel alloy material. Furthermore, interfaces subject to excessive wear from moving contact will preferably incorporate wear plates to limit such wear, enable adjustment to compensate for such wear and/or to enable replacement of worn contact surfaces. Such wear plates are preferably made from hardened steel alloy capable of withstanding high abrasion.

Now, we turn to a discussion of fabrication functionality of the block forming apparatus 100 for forming a structural building block. A method in accordance with the present invention, which is referred to herein as the method 200, is depicted in FIGS. 6-11. While the method 200 is depicted and discussed as being carried out in accordance with the block forming apparatus 100 depicted in FIGS. 1-5, a skilled person will appreciate that other apparatuses in accordance with the present invention are fully capable of carrying out the method 200.

Figure 6:
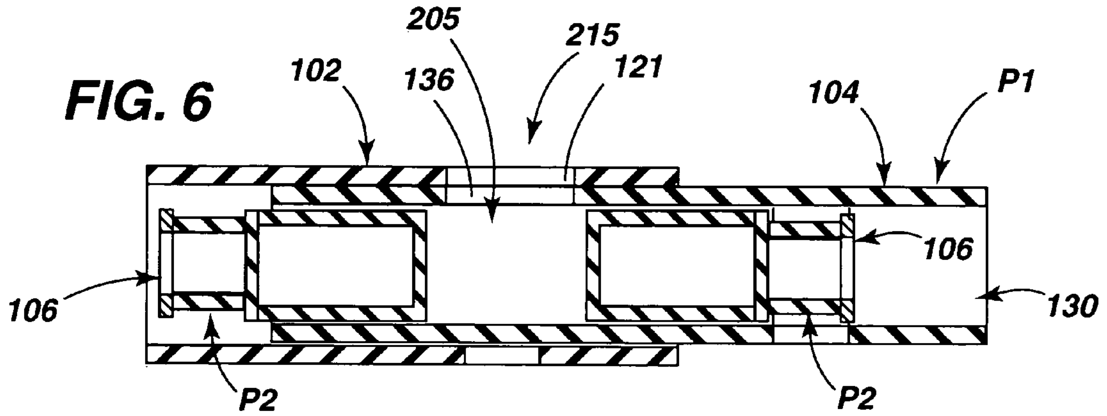
FIGS. 6-11 depict a method for fabricating a compacted structural building block in accordance with an embodiment of the present invention.

Referring now to FIG. 6, a block fabrication cycle begins with facilitating relative positioning of the compression case 104 and each two compression body 106 for forming a media receiving cavity 205 within the compression body receiving passage 130 between the compression bodies 106. Relative to completion of a previously performed block fabrication cycle, facilitating such relative positioning for forming the media receiving cavity 205 includes moving the compression case 104 to a respective media loading position P1 relative to the frame 102 and moving each compression body 106 to a respective media loading position P2 relative to the compression case 104. With the compression case 104 in its respective media loading position P1 and each compression body 106 in its respective media loading position P2, the media receiving cavity 205 is provided within the compression body receiving passage 130 between the two compression bodies 106.

Figure 7:
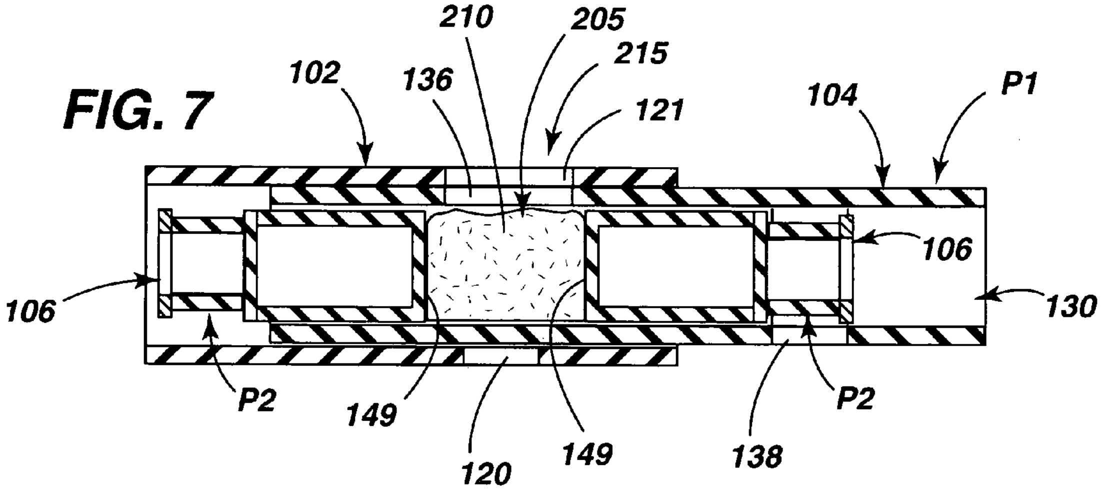

As depicted in FIG. 7, a quantity of media 210 from which a building is made is deposited into the media receiving cavity 205 through an opening 215 defined by the media fill openings (119, 136) of the frame 102 and the compression case 104 after relative positioning of the compression case 104 and each two compression body 106 is performed for forming the media receiving cavity 205. Examples of such media 210 include, but are not limited to, freshly dug soil, conditioned soil (e.g., aerated soil), soil enhanced with known binding material and/or known inert filler material such as plant cellulose, industrial waste and the like. It is disclosed herein that the media can be deposited through use of any number of media delivery and/or conditioning apparatuses. In view of the disclosures made herein, a skilled person will identify and/or devise one or more media delivery and/or conditioning apparatuses suitable for delivering media in a relatively low-density form to the media receiving cavity 205. Thus, such media delivery and/or conditioning apparatuses will not be discussed herein in further detail.

It is disclosed herein that the quantity of media 210 will preferably be of a relatively low density with respect to the density of media in corresponding formed structural building block. In one embodiment of the present invention, the quantity of the media 210 delivered to the media receiving cavity 205 is quantitatively determined prior to or in conjunction with the quantity of media 210 being deposited in the media receiving cavity 205. In another embodiment, a length of deposit time is correlated to the quantity of media 210. In yet another embodiment, a weight is correlated to the quantity of media 210. Instill another embodiment, a fill level of media within the media receiving cavity 205 is determined in conjunction with delivery of the quantity of media 210.

Figure 8:
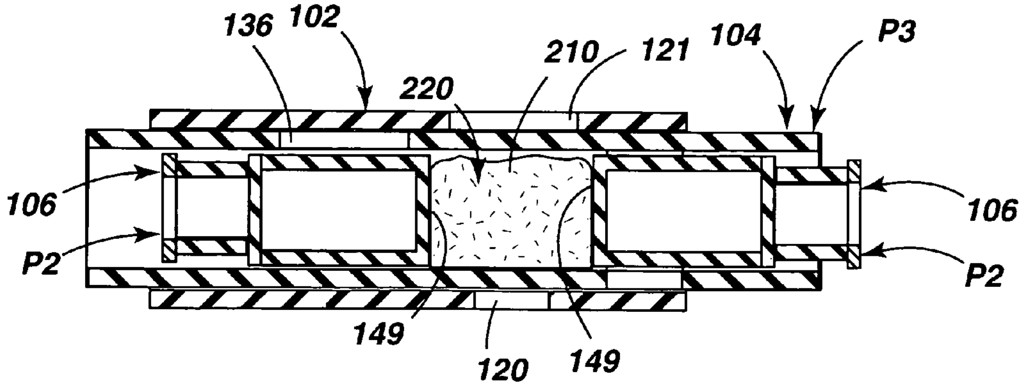

After the quantity of media 210 is deposited within the media receiving cavity 205, relative positioning of the compression case 104 is facilitated for closing an entry 215 into the media receiving cavity 205 through which the quantity of media 210 was deposited (FIG. 8). Facilitating relative positioning of the compression case 104 for closing the entry 215 includes moving the compression case 104 to a chamber sealing position P3 relative to the media fill opening 121 of the frame 102. In the chamber sealing position P3, the media fill opening 136 of the compression case 104 is entirely offset from the media fill opening 121 of the frame 102. Upon closing of the entry 215, the space within the compression body receiving passage 130 between the two compression bodies 106 becomes a media compression chamber 220 (i.e., a generally sealed chamber).

Figure 9:
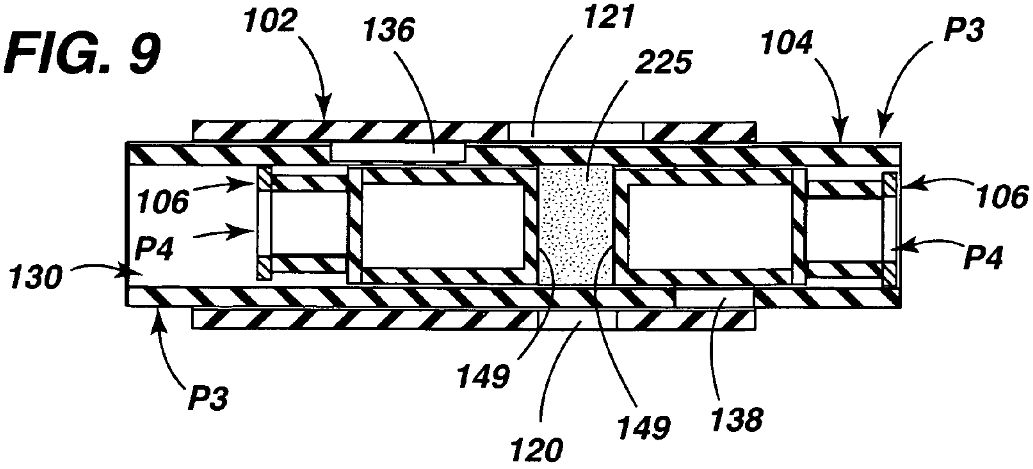
Figure 10:
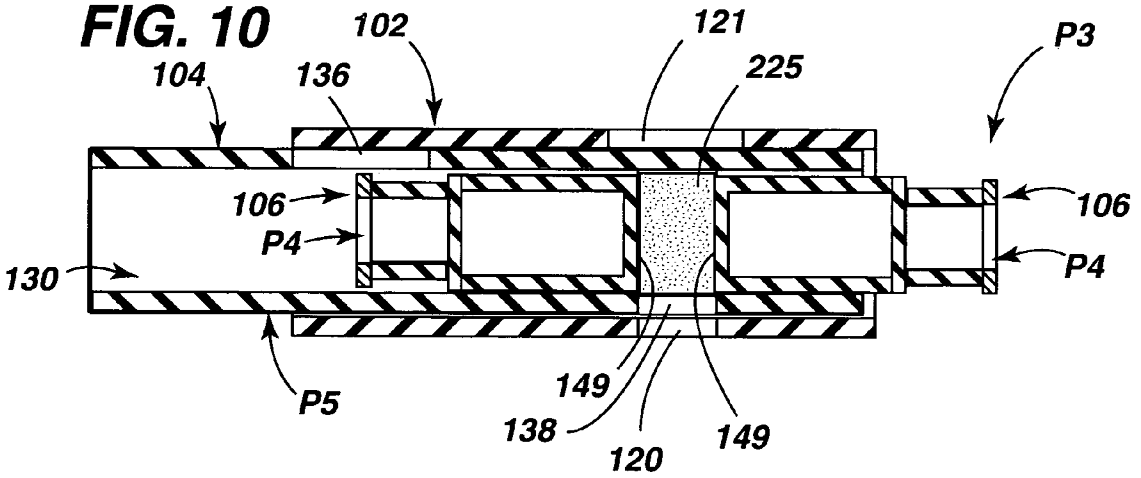

Next, as depicted in FIG. 9, each compression body 106 is moved toward the other compression body 106 under sufficient applied force to compress the quantity of media 210 into a structural building block 225. A compressed quantity and shape of the structural building block 225 corresponds to the cross sectional shape and cross-sectional area of the compression body receiving passage 130 and a distance between the inboard face 149 of each compression body 106 when each compression body 106 is in a fully displaced position P4. In one embodiment of the present invention, longitudinal displacement of each compression body 106 is determined for enabling assessment of a degree of compaction of the quantity of media 210 and/or for enabling assessment of physical dimensions of the structural building block 225.

With the quantity of media 210 (FIG. 8) compressed into the structural building block (FIG. 9), relative positioning of the compression case 104 and the compression bodies 106 is facilitated for enabling discharge of the structural building block 225 from within the compression chamber 220 through the block discharge openings 120 of the frame 102 and through the block discharge opening 138 of the compression case 104. Facilitating relative positioning for enabling discharge includes moving the compression case 104 to a block discharging position P5 with respect to the compression bodies 106 and removing all or a portion of the applied force on the compression bodies 106 whereby the compression bodies 106 are in substantially non-compressing engagement with the structural building block 225. The operation of removing all or a portion of the applied force on the compression bodies 106 by the compression bodies 106 reduces the potential for pressure exerted by the compression bodies 106 resulting in damage to the structural building block 225 as the compression case 104 is moved from the chamber sealing position P3 to the block discharging position P5. Moving the compression case 104 to the block discharging position P5 includes limiting longitudinal movement of the compression bodies 106 while moving the compression case 104 to the block discharging position P5. In the block discharging position P5 (FIG. 10), a central axis C3 of the block discharge opening 138 of the compression case 104 is aligned with a central axis C4 of the block discharge opening 120 of the frame 102 and the block discharge opening 138 of the compression case 104 is laterally between the inboard faces 149 of the compression bodies 106.

Figure 11:
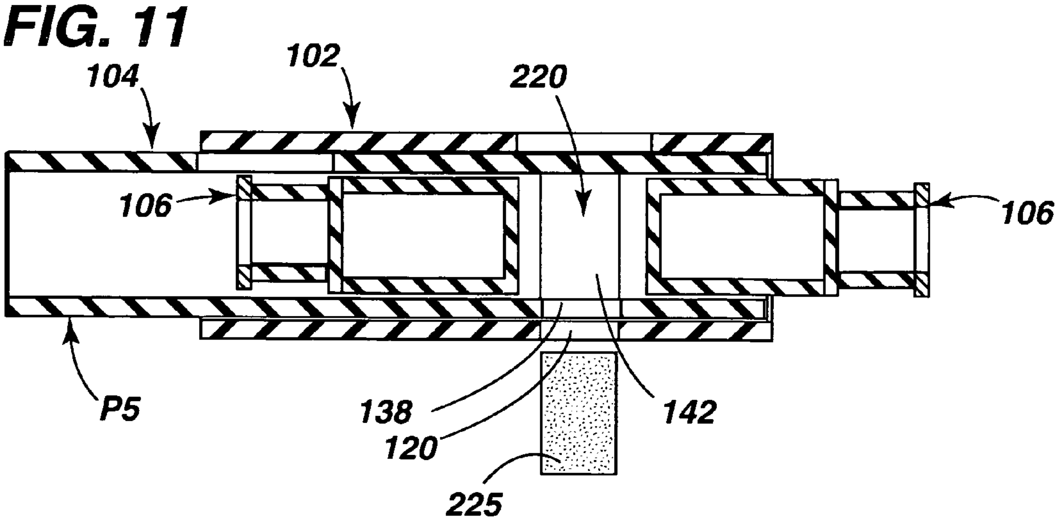

With the compression case 104 in the block discharging position P5, the compression bodies 106 are moved toward the respective media loading position P2 (FIG. 11). Moving the compression bodies toward their respective media loading position P2 disengages the compression bodies 106 from the structural building block 225. This disengagement in conjunction with structural building block 225 being exposed to the block release recesses (140, 142) of the compression case 104 promotes discharging of the structural building block 225 from within the compression body receiving passage 130 of the compression case 104. Discharge of the structural building block 225 completes the block fabrication cycle.

It is disclosed herein that a vibratory apparatus can be attached to each compression body 106 and/or to the compression case 104. In compressing media to form the structural building block 225, portions of the media engaged with each compression body 106 can sometimes have a tendency to stick to one of the engaged compression bodies 106. Attachment of a vibratory apparatus to each compression body 106 and activation of the vibratory apparatus just prior to when the engaged compression bodies 106 is moved toward its respective media loading position P2 will contribute to releasing media of the structural building block 225 from engaged compression bodies 106. In doing so, the tendency for a surface of the structural building block 225 being damaged through the act of retracting the engaged compression bodies 106 is reduced.

Additionally, it is disclosed herein that the vibratory apparatus can be activated during the media fill operation. In doing so, density of the media 210 is increased by virtue of vibrations from the vibratory apparatus causing entrapped air in the media to be released.

It is disclosed herein that only one compression body 106 need be movable (i.e., the moving compression body) for forming structural building blocks through use of the block forming apparatus 100. One compression body (i.e., the stationary compression body) can be maintained in a fixed position via a substantially rigid member such as, for example, a beam connected between a chassis bulkhead and the stationary compression body. In the case of a block forming apparatus implemented with one movable compression body and one stationary compression body, an inboard face of the media compaction portion of the face the stationary compression body is aligned with an edge of the media fill opening 121 of the frame 102 (i.e., the media fill opening 121 positioned between inboard faces 149 of the compression bodies 106) and with an edge of the block discharge opening 120 of the frame 102 (i.e., the block discharge opening 120 positioned between inboard faces 149 of the compression bodies 106). Such alignment allows for block in accordance with the method 200 with the exception that only one compression body 106 is moved relative to the frame 102.

Figure 12:
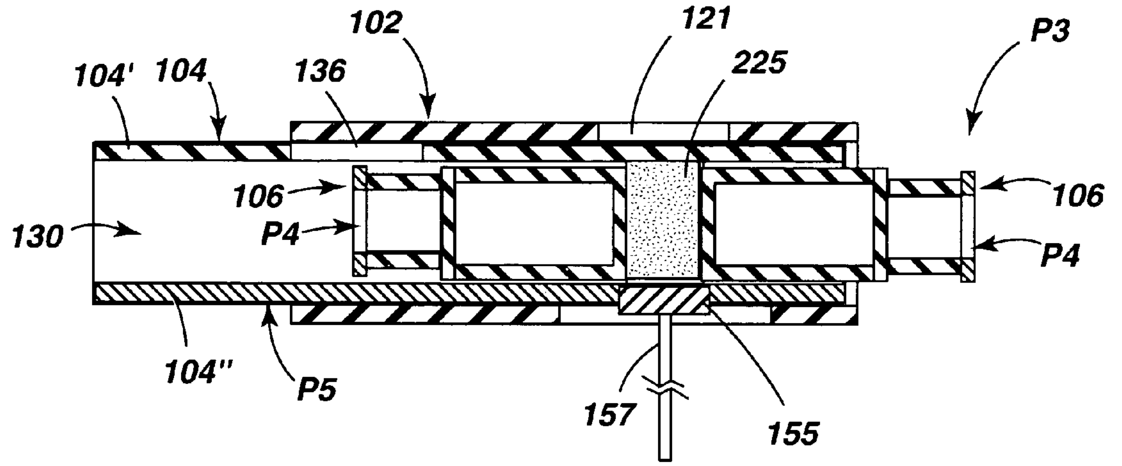
FIGS. 12 and 13 depicts an alternate construction and operation of the block forming apparatus depicted in FIG. 1 and FIGS. 6-11.
Figure 13:
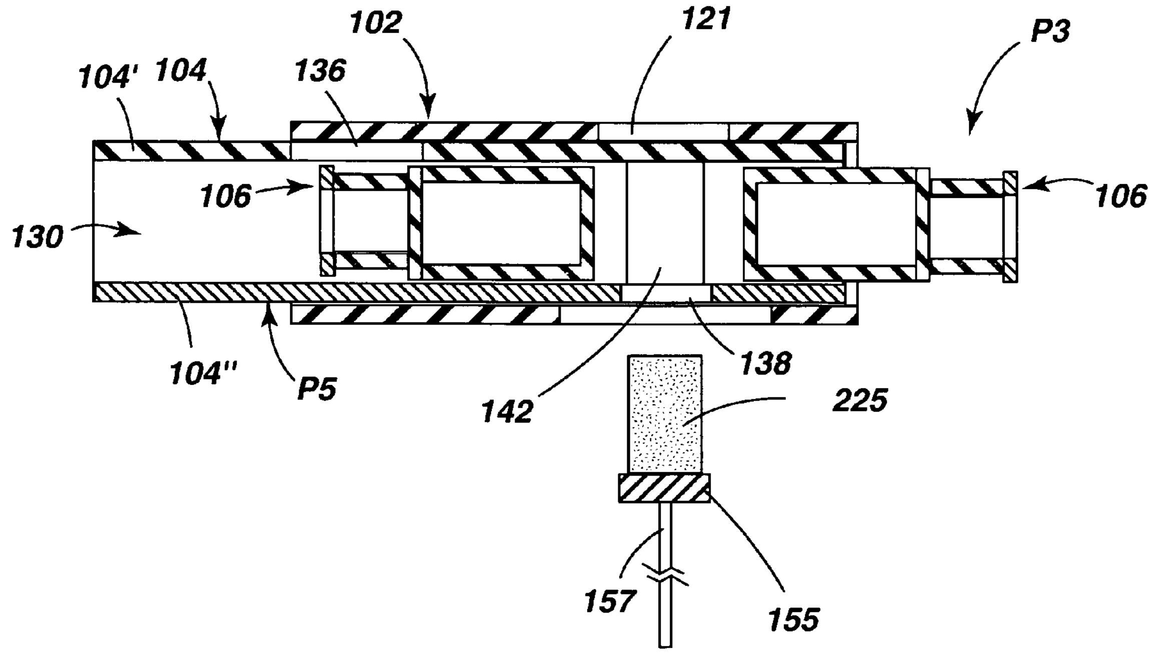

FIGS. 12 and 13 depict an alternate embodiment of the block forming apparatus 100 depicted in FIGS. 1 and 6-11. In this alternate embodiment, the compression case 104 includes a movable portion 104' and a fixed portion 104". The movable portion 104' moves substantially the same as discussed in reference to FIGS. 6-9. The fixed portion is immovably attached to the frame 102 or to an immovable structure of a block press in which the block forming apparatus 100 is incorporated. The fixed portion 104" includes a cavity plate 155 connected to a cavity plate actuator 157. As depicted in FIG. 12, the cavity plate 155 resides within the block discharge opening 138 during the operations of loading media (discussed in reference to FIGS. 6 and 7), during the operations of compressing the media (discussed in reference to FIGS. 8 and 9) and during the operation of releasing load on the compression bodies 106 (discussed in reference to FIG. 9). For facilitating discharge of the structural building block 225 (see FIG. 13), the cavity plate actuator 157 (e.g., a hydraulic actuator) moves the cavity plate 155 such that the structural building block 225 is lowered via movement of the cavity plate 155. Thereafter, a manual or automated operation for indexing or removing the structural building block 225 is performed.

It is disclosed herein that all or a portion of the surface of the cavity plate 155 exposed within the compression receiving passage 130 of the compression body 104 can have a texture formed thereon. In this manner, a corresponding textured pattern is formed on a face of the structural building block 225 that is engaged with the cavity plate 155.

Figure 14:
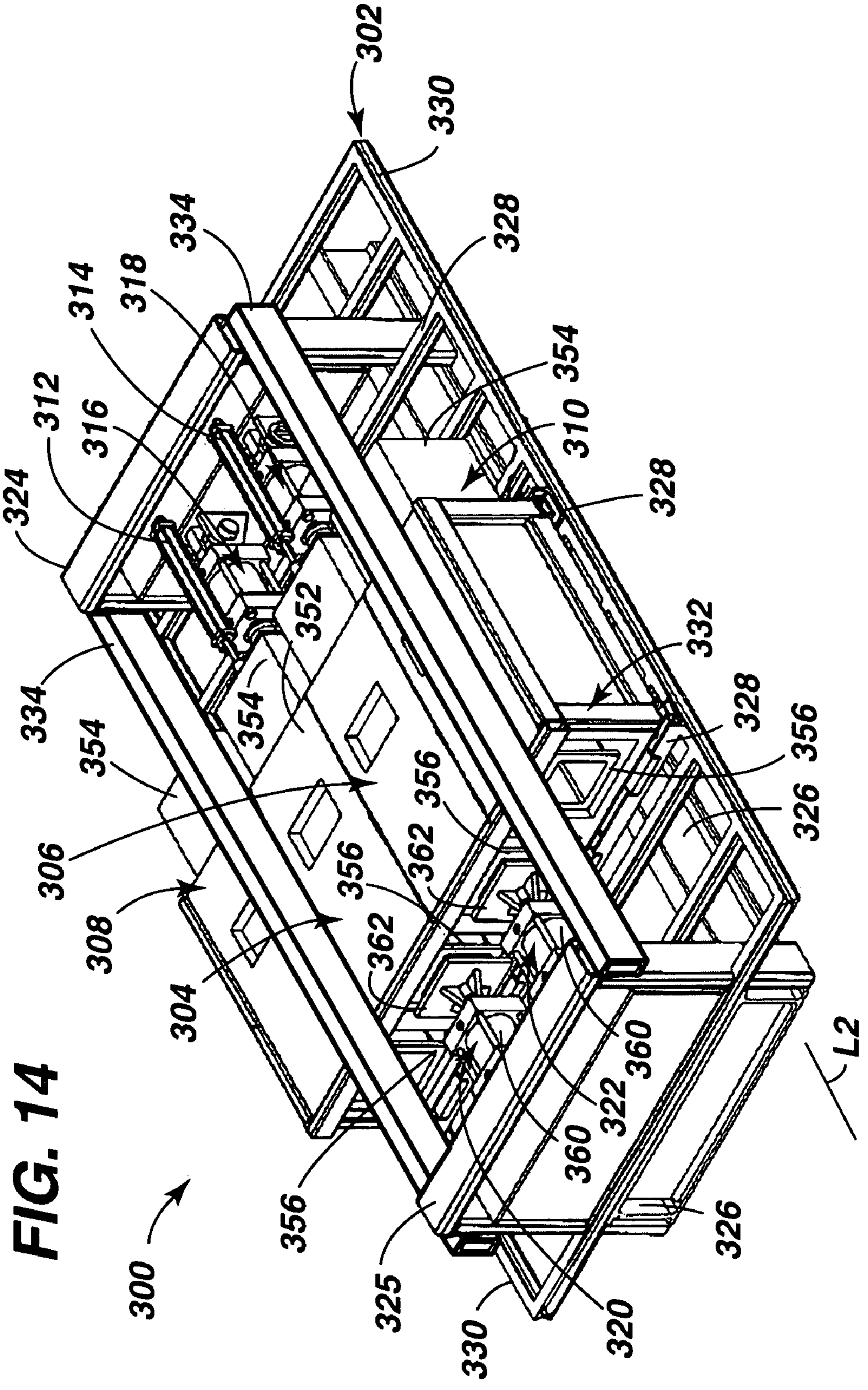
FIG. 14 depicts a block press in accordance with the present invention.

FIG. 14 depicts a block press in accordance with the present invention, which is referred to herein generally as the block press 300. The block press 300 includes a chassis 302, a plurality of block forming apparatuses (304-310), a plurality of compression case actuators (312, 314) and a plurality of compression body actuators (316-322). The chassis 302 includes spaced apart bulkheads (324, 325), a plurality of longitudinal main beams 326, a plurality of lateral support beams 328, a plurality of longitudinal support beams 330, a block forming apparatus carriage 332 and a plurality of upper support beams 334. The bulkheads (324, 325) are each attached at their lower end to the longitudinal main beams 326 in a spaced apart upright manner. The lateral support beams 328 are each attached to the longitudinal main beams 326 extending generally perpendicular in direction to that of the longitudinal main beams 326. The upper support beams 334 are attached between upper ends of the bulkheads (324, 325). The block forming apparatus carriage 332 is engaged with a plurality of the lateral support beams 328 between the bulkheads (324, 325).

As depicted in FIG. 14, the block forming apparatus carriage 332 and engaged ones of the lateral support beams 328 are jointly configured for enabling lateral movement of the block forming apparatus carriage 332 with respect of a longitudinal reference axis L2 of the chassis 302. However, it is disclosed herein that the block forming apparatus carriage 332 can be non-movable with respect to the chassis 302. Optionally, a block press apparatus in accordance with the present invention and configured substantially the same as the block press 300 can have only a single block press apparatus mountable thereon.

The plurality of block forming apparatuses (304-310) are mounted on the block forming apparatus carriage 332. Advantageously, each one of the block forming apparatuses (304-310) is self-contained and is preferably mounted in the block forming apparatus carriage 332 without the use of fasteners. For example, mating locating structures can be incorporated into the block forming apparatus carriage 332 and each one of the block forming apparatuses (304-310) for facilitating locating and retention functionality of the block forming apparatuses (304-310) with respect to the block forming apparatus carriage 332. Optionally, physical fastening means (e.g., threaded fasteners) can be used for locating and fastening each one of the block forming apparatuses (304-310) to the block forming apparatus carriage 332.

Each one of the block forming apparatuses (304-310) has a construction substantially the same the block forming apparatus 100 depicted and discussed in reference to FIGS. 1-13. Accordingly, for the remainder of this discussion, terminology used in the discussion of FIGS. 1-13 will be used in the discussion of the plurality of block forming apparatuses (304-310). The reader is encouraged to refer to the discussion of FIGS. 1-13 for additional details into the structure and function of the block forming apparatuses (304-310).

Each one of the block forming apparatus (304-310) includes a frame 352, a compression case 354 and two compression bodies 356. The frame 352 is releasably engaged with the block forming apparatus carriage 332. Each compression case 354 is movably engaged with a frame 352 of the respective block forming apparatus (304-310) in a manner enabling movement of the compression case 354 along a respective longitudinal reference axis. The respective longitudinal reference axis of compression case 354 of each block forming apparatus (304-310) extends substantially parallel with the longitudinal reference axis L2 of the chassis 302. The compression case 354 of each block forming apparatus (304-310) has a compression body receiving passage extending between opposed end faces thereof along the respective longitudinal reference axis of the compression case 354. Each block forming apparatus (304-310) has two compression bodies 356 movably mounted within the compression body receiving passage of the compression case in a manner enabling movement of the compression bodies 356 along the longitudinal reference axis of the compression case 354.

A first compression case actuator 312 is connected between the first bulkhead 324 and the compression case 354 of a first block forming apparatus 304. A second compression case actuator 316 is connected between the first bulkhead 324 and the compression case 354 of a second block forming apparatus 306. Each one of the compression case actuators (324, 325) is connected between one of the bulkheads and a respective one of the block forming apparatuses (304-310) for facilitating movement of the attached compression case to accomplish positioning functionality as discussed in reference the method of FIGS. 6-11. A hydraulic cylinder is an example of each one of the compression case actuators (324, 325).

Each compression case actuator (312, 314) is releasably connected to the respective compression case and is pivotably connected to the first bulkhead 324. This releasable and pivotable mounting configuration advantageously allows each compression case actuator (312, 314) to be independently disconnected from the respective compression case and pivoted out of the way, which is useful when servicing, replacing or switching position of one or more of the block fabrication apparatuses (304-310).

A first compression body actuator 316 and a second compression body actuator 318 are attached to the first bulkhead 324. A third compression body actuator 320 and a fourth compression body actuator 322 are attached to the second bulkhead 324. The first compression body actuator 316 is longitudinally aligned with the third compression body actuator 320. The second compression body actuator 318 is longitudinally aligned with the fourth compression body actuator 322. Spacing between the first compression body actuator 316 and the second compression body actuator 318 is substantially the same as the spacing between longitudinal reference axes of the adjacent block fabrication apparatuses (304-310). Spacing between the third compression body actuator 320 and the fourth compression body actuator 322 is substantially the same as the spacing between longitudinal reference axes of the adjacent block fabrication apparatuses (304-310).

The compression body actuators (316-322) each include a force generating device 360 (e.g., a hydraulic cylinder) and a platen 362 attached to the force generating device 360. A first end of the force generating device 360 is attached to a respective one of the bulkheads (324, 325). A second end of the force generating device 360 is attached to the platen 362. Through lateral positioning of the block forming apparatus carriage 332, two adjacent ones of the block fabrication apparatuses (304-310) are aligned with in line-pairs of the compression body actuators (316-322). For example, as depicted in FIG. 14, the block forming apparatus carriage 332 is positioned such that the first compression body actuator 316 and the and third compression body actuator 320 are aligned with the first block forming apparatus 304 and the second compression body actuator 318 and the and fourth compression body actuator 322 are aligned with the second block forming apparatus 306.

Each force generating device 360 delivers a force to the respective compression body 356 by application of such force through the platen 362 (e.g., via engagement with a flange of an actuator engagement portion of the compression body 356). Accordingly, each force generating device 360 is capable of facilitating movement of a respective compression body 356 toward an opposing compression body 356. Retraction of two opposed compression bodies can be facilitated by one of any number of different approaches. For example, each platen 362 can be physically attached to a respective compression body 356 such that retraction of the platen 362 causes a corresponding retraction of the attached compression body 356.

However, for reasons of time and convenience, it is preferable that the compression body actuators (316-322) are not physically attached to the compression bodies 356 such that the block forming apparatuses (304-310) can be removed, replaced and/or serviced without requiring disconnection from the compression body actuators (316-322). To this end, it is disclosed herein that each block forming apparatuses (304-310) can be configured for facilitating self-retraction of each compression body 356. For example, a return spring can be attached between each compression body 356 and a respective compression case 354 or a respective frame 352 for returning the compression body 356 to a static position (e.g., no appreciable force applied by the return spring) from a displaced position (i.e., a position corresponding to full compression of a structural building block).

It is disclosed herein that platen spacers can be attached to a compression block engagement face of one or more platen 362 for adjusting a displaced distance of a respective one of the compression bodies 306. In such an arrangement, a space is provided between the plate 362 and the respective compression body 306. Accordingly, a portion of the total travel of the respective compression body actuator 322 is used for accomplishing contact between the platen 362 and the compression body 306. Through use of such spacers, the amount of travel of the respective compression body actuator 322 can be adjusted.

It is disclosed herein that the static position of each compression body can be adjustable such that a media receiving cavity length is adjustable. For example, a compression body limiter can be adjustable attached to a frame of a block press apparatus such that an adjusted position of the compression body limiter dictates the static position of the compression body. Examples of the usefulness in being able to readily vary the quantity of the media receiving cavity include, but are not limited to, compensating for media density for a given block size, providing for different block sizes and limiting compression body stroke.

Through the disclosed construction of the block press 300, the block press 300 is specifically configured for simultaneously making up to two blocks. However, as depicted, one pair of opposed compression body actuators can be deactivated/removed, allowing for only one block to be made per block making cycle. Also, it is disclosed herein that the chassis 302 can be configured for allowing the addition of compression body actuators and compression case actuators such that all of the block forming apparatuses (304-310) can simultaneously make building blocks.

Through implementation of a plurality of block forming apparatuses (304, 310), building blocks of different configuration (e.g., sizes, shapes, textures, colors, etc) can be readily made without the need to remove and install new block forming apparatuses. Lateral adjustment of the block forming apparatus carriage 332 enables selection of the block forming apparatuses (304-310), which will be presently active. Also, relative positioning of the installed block forming apparatuses (304-310) within the block forming apparatus carriage 332 can be facilitated as needed to achieve a desired mix of blocks configurations. As depicted, the block press 300 is configured for enabling up to 4 different configurations of blocks to be made without the need to remove and install new block forming apparatuses. If desired, multiple block forming apparatuses (304, 310) of the block press can be used for making the same configuration building block (e.g., simultaneously making two blocks of the same configuration).

A skilled person will recognize that any number of different systems can be utilized for facilitating control of a block press in accordance with the present invention (e.g., the block press 300) for carrying out a block fabrication method in accordance with the present invention (e.g., the method 200). More specifically, it will be appreciated that a programmable control unit (e.g., a programmable logic control unit) can be used to control one or more hydraulic pumps, one or more control valves and other known control components in a manner suitable for carrying out block fabrication functionality in accordance with the present invention. For example, through the use of position sensors for sensing movement and/or position of components of a block press in accordance with the present invention and by controlling delivery of pressurized hydraulic fluid to actuators of such a block press, required movement and positioning of such block press components can be accomplished. However, the present invention is not limited by such chosen, known control solutions. Different known control solutions of various configurations can be used with equal or suitable success in controlling a block press and/or method in accordance with the present invention.

Referring now to FIGS. 15-22, shown are various aspects on a block forming apparatus 400 specifically configured in accordance with an embodiment of the present invention for forming structural building blocks by compacting block forming media and curing of a curable binding material dispersed within the block forming media. The block forming apparatus 400 includes a frame 402, a compression case 404 and two opposed compression bodies 406. As is discussed in greater detail below, the frame 402, the compression case 404 and the two opposed compression bodies 406 are configured and interoperable in a manner that enabling the block forming apparatus 400 to carry out block fabrication functionality in accordance with present invention (e.g., in accordance with the method 500 disclosed herein).

As will become apparent in the ensuing discussion, the block forming apparatus 400 advantageously has a substantially integrated construction such that can be readily implemented into a block press having a substantially modular construction (i.e., the block forming apparatus 400 is a component of such modular construction). Alternatively, the block forming apparatus 400 can be implemented in a block press in a non-modular and/or non-interchangeable manner. Additionally, the block press apparatus 400 can be used in a block press configured for having a single block press apparatus mounted thereon at any point in time or a plurality of block press apparatuses mounted thereon at any point in time.

The frame 402 is preferably, but not necessarily, an elongated rectangular cross-section tube having an upper wall 410, a lower wall 412 and spaced-apart side walls 414. Both spaced apart side walls 414 are not shown, but can have the same configuration as spaced-apart side walls 114, 116 shown in FIG. 1. The frame 402 includes compression case receiving passage 417 defined by interior surfaces of the walls (410-414) of the frame 402. The compression case receiving passage 417 extends between opposed end faces (418, 419) of the frame 402.

A media fill opening 421 extends through the upper wall 410 of the frame 402 and a block discharge opening 420 extends through the lower wall 412 of the frame 402 such that the media fill opening 421 and the block discharge opening 420 are communicative with the compression case receiving passage 417. Preferably, but not necessarily, a central axis C 1 of the media fill opening 421 is aligned with a central axis C2 of the block discharge opening 420. It is disclosed herein that the central axes (C1, C2) of the media fill opening 421 and the block discharge opening 420 need not be fully aligned with each other.

The compression case 404 is slideably engaged within the compression case receiving passage 417 of the frame 402. The slideable engagement between the frame 402 and the compression case 404 enables movement of the compression case 404 relative to the frame 402 along a longitudinal reference axis L1 of the compression case 404. In the depicted embodiment, the compression case 404 is preferably, but not necessarily, an elongated rectangular cross-section tube having an upper wall 422, a lower wall 424 and spaced apart side walls 426. Both spaced-apart side walls 426 are not shown, but can have the same configuration as spaced-apart side walls 126, 128 shown in FIG. 1.

Interior surfaces of the walls (422-426) of the compression case 404 define a compression body receiving passage 430 extending between opposed end faces (432, 434) of the compression case 404 along the longitudinal reference axis L1. A media fill opening 436 extends through the upper wall 422 of the compression case 404 and a block discharge opening 438 extends through the lower wall 424 of the compression case 404. The media fill opening 436 of the compression case 404 and the block discharge opening 438 of the compression case 404 are communicative with the compression body receiving passage 430.

The respective interior surface of each one of the side walls 426 has a respective block release recess 442 therein. These block release recesses are not shown in FIG. 15, but can be substantially the same as the block release recesses (140, 142) shown in FIG. 4. The block release recesses extending between the upper wall 422 and the lower wall 424. The block release recesses are positioned between a forward lateral edge 444 of the block discharge opening 438 and a rear lateral edge 446 of the block discharge opening 438. Preferably, a width of each one of the block release recess is the same as a length of the block discharge opening 438. A central axis C3 of the media fill opening 436 of the compression case 404 is offset from a central axis C4 of the block discharge opening 438 of the compression case 404.

At a minimum, the central axis C3 of the media fill opening 436 of the compression case 404 is offset from the central axis C4 of the block discharge opening 438 by a distance equal to a length of the media fill opening 436 of the compression case 404. It is disclosed herein that, in an alternate embodiment of the compression case 403 (not shown), the block discharge opening 438 intersects adjacent end 434 of the compression case 404. In such an alternate embodiment, the adjacent end 434 of the compression case 404 defines the rear lateral edge 446 of the block discharge opening 438.

Preferably, dimensions of the block discharge opening 420 of the frame 402 are the same as or larger than the corresponding dimensions of the block discharge opening 438 of the compression case 404. Similarly, it is preferable that dimensions of the media fill opening 421 of the frame 402 are the same as or larger than the corresponding dimensions of the media fill opening 438 of the compression case 404.

It is disclosed herein that the frame 402 and the compression case 404 can optionally both have a different cross sectional shape than rectangular. Examples of such different cross-sectional shapes include, but are not limited to, round, hexagonal, etc. In view of the disclosures made herein, a skilled person will appreciate that the present invention is not necessarily limited to a particular cross-sectional shape of the frame 402 or the compression case 404. Additionally, a skilled person will appreciate that the frame 402 can be a non-tubular structure (e.g., an open chassis) while still providing for the required functionality of movable engagement with the compression case 404 and necessary engagement of the block forming apparatus 400 by a block press.

Referring now to FIGS. 1, 2 and 5, each compression body 406 is slideably mounted within the compression body receiving passage 430 of the compression case 404. Thus, each compression body 406 is mounted in a manner enabling movement (i.e., simultaneous, independent and/or linked) of each compression body 406 along the longitudinal reference axis L1 of the compression case 404. Similar to the compression body 106 shown in FIGS. 1, 2 and 5, each compression body 406 has a media compaction portion and an actuator engagement portion connected to the media compaction portion. An inboard face of the media compaction portion can be substantially flat, can be partially flat with a non-flat feature or can be substantially contoured. The media compaction portion of each compression body has a relatively low clearance fit (i.e., an intimate fit) within the compression body receiving passage and, preferably, a length of the media compaction portion is relatively long with respect to cross-sectional dimensions of the compression body receiving passage 430 to limit a tendency for rocking within compression body receiving passage 430. The actuator engagement portion includes a generally flat engagement flange. The engagement flange enables distributed delivery of a force onto the compression body 406 through a force application means such as, for example, a force application platen connected to a hydraulic cylinder.

Preferably, but not necessarily, the actuator engagement portion of each compression body 406 is sized to provide a relatively large clearance between perimeter edges thereof and the interior surfaces of the walls (422-426) of the compression body 404. Optionally, all of the actuator engagement portion of each compression body 406 or a portion of the actuator engagement portion of each compression body 406 can have a relatively low clearance fit with the compression body receiving passage 430. Additionally, it is disclosed herein that the media compaction portion of each compression body 406 can consist of a flat plate attached to the actuator engagement portion 450, such that the compression body essentially includes two flat plates having a rigid member (e.g., a steel tube) connected therebetween. Additionally, one or more other flat plates serving as intermediate support ribs can be attached to the rigid member at locations between the ends of the rigid member.

A skilled person will recognize that the various components of a block press in accordance with the present invention will preferably be made from suitably strong, rigid and durable materials. For example, in view of the disclosures made herein, it will be appreciated that a frame, a compression case and compression bodies in accordance with the present invention will preferably be made from one or a collection of pieces (e.g., welded, fastened with threaded fasteners, etc) of a hardened steel alloy material. Furthermore, interfaces subject to excessive wear from moving contact will preferably incorporate wear plates to limit such wear, enable adjustment to compensate for such wear and/or to enable replacement of worn contact surfaces. Such wear plates are preferably made from hardened steel alloy capable of withstanding high abrasion.

Figure 15:
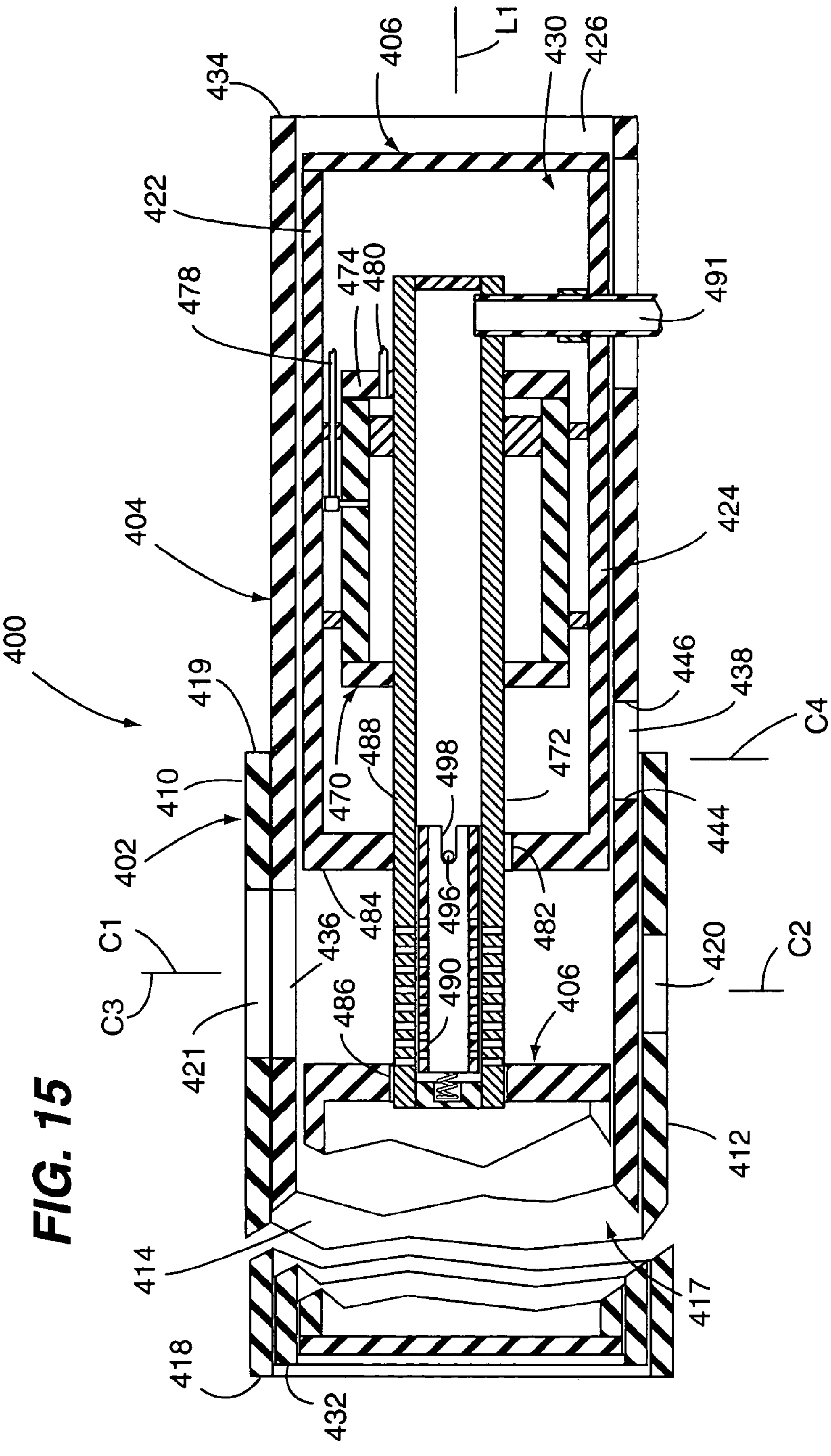
FIGS. 15-17 depict various aspects of a block forming apparatus in accordance with a second embodiment the present invention, which is configured for forming structural building blocks by compacting block forming media and curing of a curable binding material dispersed within the block forming media.

Still referring to FIG. 15, for facilitating delivery of activation material to enable curing of a curable binding material, an activation material delivery mechanism 470 is provided within a first one of the compression bodies 406. The activation material delivery mechanism 470 includes an activation material delivery device 472 and a delivery device actuator 474. In one embodiment, the activation material delivery device 472 is a ram and the delivery device actuator 474 is a forced fluid cylinder (e.g., hydraulic or pneumatic). The activation material delivery device 472 is translatably connected to the delivery device actuator 474 in a manner allowing the delivery device actuator 474 to cause translation of the activation material delivery device 472 along a delivery device translation axis extending effectively parallel with the longitudinal axis L1. For example, through application of fluid pressure at a first fluid supply line 478 and at a second fluid supply line 480, the activation material delivery device 472 translates in a first direction and a second (i.e., opposite) direction along the delivery device translation axis. The activation material delivery device 472 extends through an opening 482 in a media compressing face 484 of the first one of the compression body 406. A second one of the compression bodies 406 (i.e., the opposing compression body) has a delivery device receiving opening 486 therein such that through translation of the activation material delivery device 472, the activation material delivery device 472 can be extended into the delivery device receiving opening 486.

Figure 16:
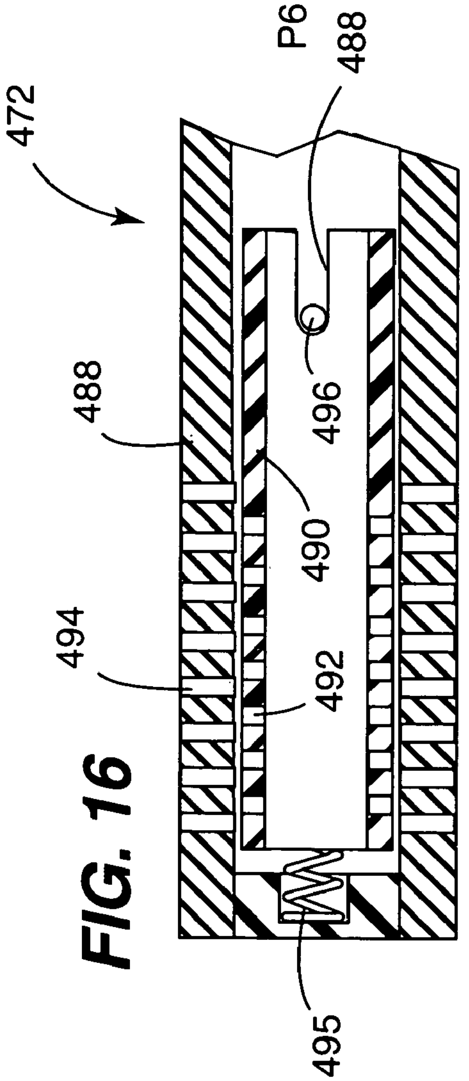
Figure 17:
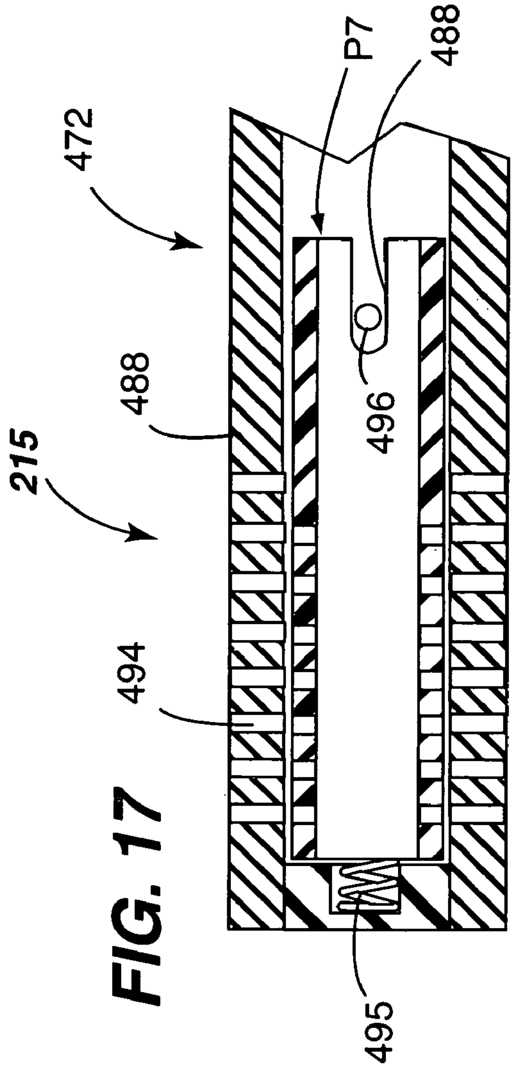

Referring now to FIGS. 15-17, the activation material delivery device 472 comprises an outer sleeve 488, an inner sleeve 490 slideably mounted within the outer sleeve 488 and a material delivery conduit 491 connected to the inner sleeve 491. Inner sleeve orifices 492 are alignable with outer sleeve orifices 494 through translation of the inner sleeve 490 with respect to the outer sleeve 488 from a retracted position P6 and a displaced position. In the retracted position P6, the orifices (492, 494) are fully misaligned to prevent flow therethrough. In the displaced position P7, the orifices (492, 494) are at least partially aligned to allow flow therethrough. A spring 495 biases the inner sleeve to the retracted position P6. An alignment member 496 is fixedly engaged with the outer sleeve 488 and engages a slot 498 of the inner sleeve 490 for preventing rotation of the inner sleeve 490 with respect to the outer sleeve 488 and for limiting the spring 495 to biasing the inner sleeve 490 to the at-rest position. Material such as, for example, an activation material or a curable binding material can be delivered into the inner sleeve 490 via the material delivery conduit 491 for allowing such material to be dispensed via the injected through the orifices (492, 494).

Now, a discussion of fabrication functionality of the block forming apparatus 400 for forming a structural building block is presented. A method in accordance with the present invention, which is referred to herein as the method 400, is depicted in FIGS. 18-22. While the method 400 is depicted and discussed as being carried out in accordance with the block forming apparatus 400 depicted in FIGS. 18-22, in view of the disclosures made herein, a skilled person will appreciate that other suitably configured block forming equipment can be used for carrying out the method 400.

Figure 18:
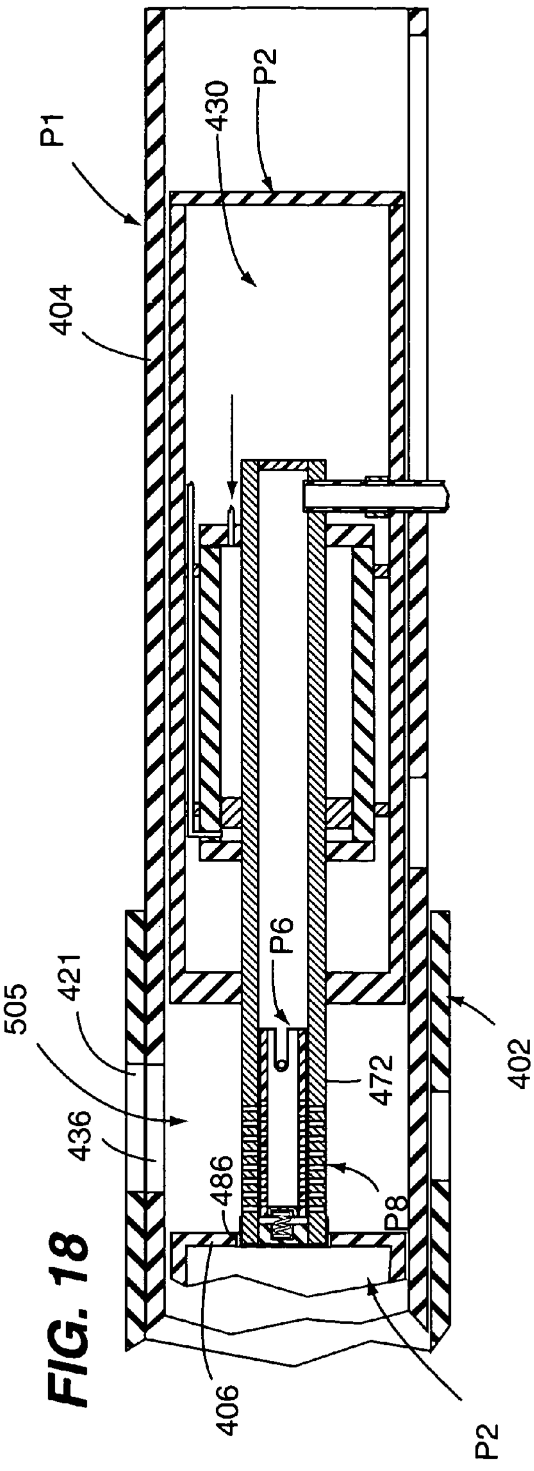
FIGS. 18-22 depict a method for fabricating a compacted and cured structural building block in accordance with an embodiment of the present invention using the block forming apparatus of FIGS. 15-17.

Referring now to FIG. 18, a block fabrication cycle begins with facilitating relative positioning of the compression case 404 and each two compression body 406 for forming a media receiving cavity 505 within the compression body receiving passage 430 between the compression bodies 406. Relative to completion of a previously performed block fabrication cycle, facilitating such relative positioning for forming the media receiving cavity 505 includes moving the compression case 404 to a respective media loading position P1 relative to the frame 402, moving each compression body 406 to a respective media loading position P2 relative to the compression case 404, and moving the activation material delivery device 472 to an extended position P8. In this configuration, the compression bodies 406 are in spaced apart relationship with respect to each other, and a tip portion of the activation material delivery device 472 is positioned within the delivery device receiving opening 486 of the opposing compression body 406 (i.e., through translation with respect to the delivery device actuator 474). Accordingly, with the compression case 404 in its respective media loading position P1 and each compression body 406 in its respective media loading position P2, the media receiving cavity 505 is provided within the compression body receiving passage 430 between the two compression bodies 406.

In the case of gravity feed of the block forming media where the compression case 404 serves as the block forming media shut-off structure for an associated media hopper/media supply, the activation material delivery device 472 must be in extended position prior to block forming media entering the media receiving cavity 505. For example, the activation material delivery device 472 can be moved to the extended position immediately following ejection of a formed block from a prior block fabrication cycle. In the case of unrestricted gravity feeding of block forming media from a hopper into the media receiving cavity 505, vibratory means or the like can be employed for causing complete fill of the media receiving cavity as defined between the compression when the media receiving cavity 505 are a prescribed distance apart from each other (i.e., defining a media receiving cavity 505 of a prescribed quantity.

Figure 19:
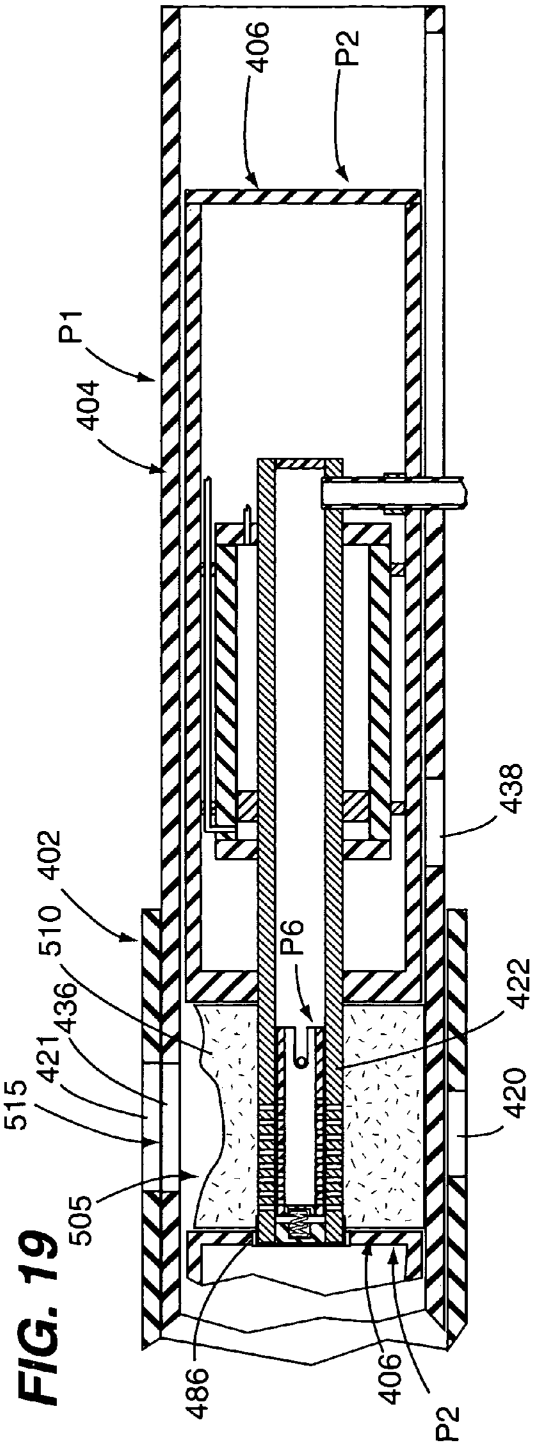

As depicted in FIG. 19, a quantity of media 510 from which a building is made is deposited into the media receiving cavity 505 through an opening 515 defined by the media fill openings (419, 436) of the frame 402 and the compression case 404 after relative positioning of the compression case 404 and each two compression body 406 is performed for forming the media receiving cavity 505. The block forming media includes a curable binding material dispersed therein. Curing of the curable binding material is caused by contact with a prescribed activation material.

It is disclosed herein that the quantity of media 510 will preferably be of a relatively low density with respect to the density of media in corresponding formed structural building block. In the case of the quantity of block forming media being controlled by a delivery hopper, there are a number of approaches for such hopper controlling such delivered quantity of block forming media. In one such approach, the quantity of the media 510 delivered to the media receiving cavity 505 is quantitatively determined prior to or in conjunction with the quantity of media 510 being deposited in the media receiving cavity 505. In another such approach, a length of deposit time is correlated to the quantity of media 510. In still another such approach, a weight is correlated to the quantity of media 510. In still another such approach, a fill level of media within the media receiving cavity 505 is determined in conjunction with delivery of the quantity of media 510. In the case of the quantity of block forming media being controlled by size of the media receiving cavity 505 and media delivery to the media receiving cavity 505 being unrestricted, one preferred approach to delivering the block forming media is to position the compression bodies 406 a prescribed distance apart such that a media receiving cavity 505 of a prescribed quantity is defined and using means such as a vibratory device to assure that this prescribed quantity is sufficiently filled with block forming media.

Figure 20:
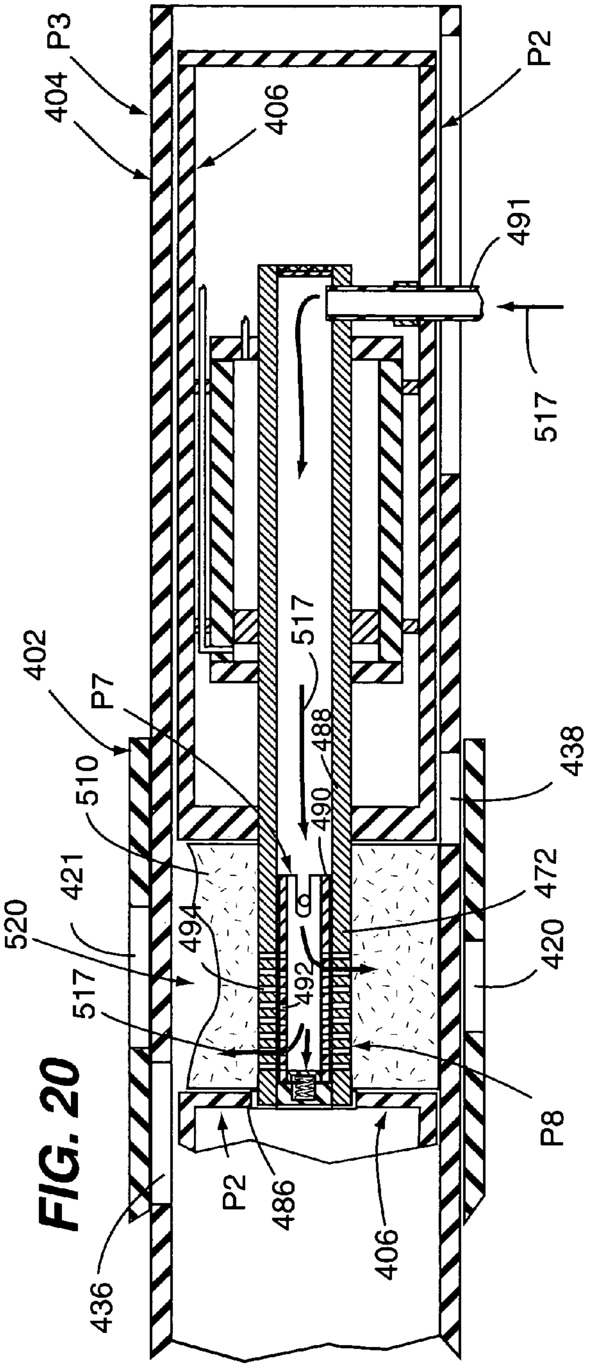

As depicted in FIG. 20, after the quantity of media 510 is deposited within the media receiving cavity 505, relative positioning of the compression case 404 is facilitated for closing the entry 515 into the media receiving cavity 505 through which the quantity of media 510 was deposited. Facilitating relative positioning of the compression case 404 for closing the entry 515 includes moving the compression case 404 to a chamber sealing position P3 relative to the media fill opening 421 of the frame 402. In the chamber sealing position P3, the media fill opening 436 of the compression case 404 is entirely offset from the media fill opening 421 of the frame 402. Upon closing of the entry 415, the space within the compression body receiving passage 430 between the two compression bodies 406 becomes a media compression chamber 520 (i.e., a generally sealed chamber).

After the positioning the compression case 404 for forming the media compression chamber 520, a quantity of the prescribed activation material 517 is injected (i.e., deposited) under pressure into the media compression chamber 520. More specifically, the quantity of media 510 at least partially covers the activation material delivery device 472 such that at least a portion of the prescribed activation material is injected into the quantity of media 510. Furthermore, the prescribed activation material is injected under high pressure whereby such high pressure results in a force being applied on the inner sleeve 490 thereby causing translation of the inner sleeve 490 with respect to the outer sleeve 488 from the at rest position P6 to the displaced position P7 and, thus, allowing flow of the prescribed activation material 517 through the orifices (492, 494) of the inner and outer sleeves (488, 490). Spring biasing force from exerted by the spring 495 causes the inner sleeve 490 to translate back to the at rest position P6 upon completion of the prescribed activation material being supplied to the activation material delivery device 472 under sufficiently high pressure.

Preferably, depositing (e.g., injecting) the prescribed activation material 517 includes delivering the prescribed activation material 517 to the activation material delivery device 472 at a pressure that causes the prescribed activation material 517 to be sprayed from the orifices (492, 494) of the inner and outer sleeves (488, 490) at high speed and/or with a high degree of exhibited turbulence. More specifically, it is preferred for the prescribed activation material 517 to be injected in a manner that causes it to be widely dispersed throughout the quantity of media 510. It is disclosed herein that the configuration of the orifices (492, 494) of the inner and outer sleeves (488, 490) can be specifically designed to enhance such velocity, turbulence and/or dispersion. For example, the orifices 492 of the inner sleeve 490 can be specifically configured for enhancing quantity and pressure of the prescribed activation material 517 as delivered to the orifices 494 of the outer sleeve 488, and the orifices 494 of the outer sleeve 488 can be specifically configured for enhancing velocity and droplet size (e.g., atomisation) of the prescribed activation material 517 as delivered to the quantity of media 510. Turbulence can also be imparted by selection of a curable binding material and corresponding activation material that together react in a turbulent manner (e.g., bubbling, foaming, etc). Such binding material induced turbulence can be at least partially controlled/mitigated through compressions exerted on the block forming media by the compression bodies 406. The amount of the prescribed activation material 517 can be dictated by an amount of time such injection is performed or by a quantity of the prescribed activation material 517 that is delivered.

Figure 21:
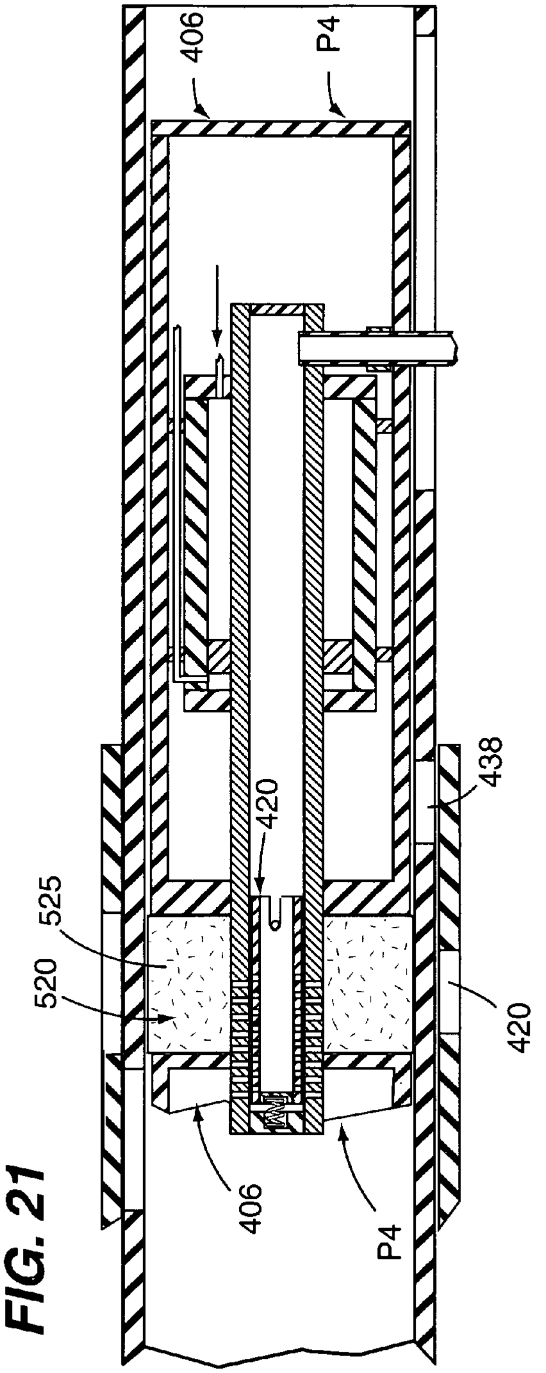

As depicted in FIG. 21, during or after injection of the prescribed activation material, each compression body 406 is moved toward the other compression body 406 under sufficient applied force to compress the quantity of media 510 into a structural building block 525. A compressed quantity and shape of the structural building block 525 corresponds to the cross sectional shape and cross-sectional area of the compression body receiving passage 430 and a distance between the inboard faces (i.e., media engaging face) of each compression body 406 when each compression body 406 is in a fully displaced position P4 (i.e., as dictated by a maximum applied pressure, a defined travel limit, or the like). In one embodiment of the present invention, longitudinal displacement of each compression body 406 is determined for enabling assessment of a degree of compaction of the quantity of media 510 and/or for enabling assessment of physical dimensions of the structural building block 525.

With the quantity of media 510 (FIG. 20) compressed into the structural building block (FIG. 21) and, optionally, after a prescribed curing time for the curable binding material has elapsed (e.g., after the curable binding material has cured to a specified or approximated degree such as a gel or crystallized state), relative positioning of the compression case 404 and the compression bodies 406 and retraction of the activation material delivery device 472 is facilitated for enabling discharge of the structural building block 525 from within the compression chamber 520 through the block discharge openings 420 of the frame 402 and through the block discharge opening 438 of the compression case 404. Facilitating relative positioning for enabling discharge includes moving the compression case 404 to a block discharging position P5 with respect to the compression bodies 406 and removing all or a portion of the applied force on the compression bodies 406 whereby the compression bodies 406 are in substantially non-compressing engagement with the structural building block 525. The operation of removing all or a portion of the applied force on the compression bodies 406 by the compression bodies 406 reduces the potential for pressure exerted by the compression bodies 406 resulting in damage to the structural building block 525 as the compression case 404 is moved from the chamber sealing position P3 to the block discharging position P5. Moving the compression case 404 to the block discharging position P5 includes limiting longitudinal movement of the compression bodies 406 while moving the compression case 404 to the block discharging position P5. In the block discharging position P5 (FIG. 10), a central axis C3 of the block discharge opening 438 of the compression case 404 is aligned with a central axis C4 of the block discharge opening 420 of the frame 402 and the block discharge opening 438 of the compression case 404 is laterally between the inboard faces of the compression bodies 406.

Figure 22:
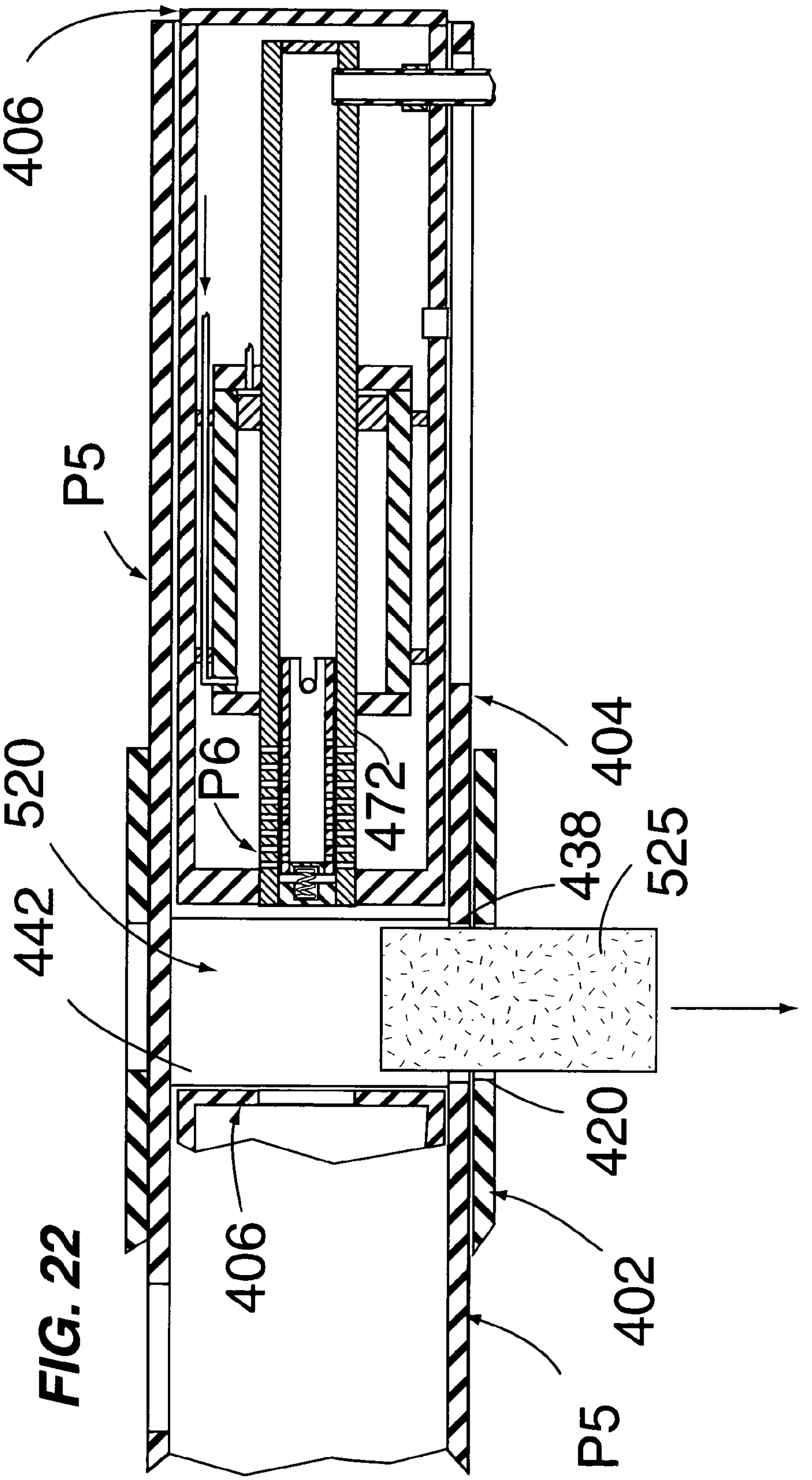

With the compression case 404 in the block discharging position P5 and the activation material delivery device 472 moved to its retracted position P6, the compression bodies 406 are moved toward the respective media loading position P2 (FIG. 22). Moving the compression bodies 406 toward their respective media loading position P2 disengages the compression bodies 406 from the structural building block 525. This disengagement in conjunction with structural building block 525 being exposed to the block release recesses of the compression case 404 promotes discharging of the structural building block 525 from within the compression body receiving passage 430 of the compression case 404. Alternatively, means such as block holding pad device of the compression case 404 can be selectively engaged with the structural building block 525, the activation material delivery device 472 and compression bodies 406 can be retracted, and then the block holding means retracted to allow the structural building block 525 to be discharged (e.g., under the force of gravity). In one embodiment, the block holding pad device include an inflatable diaphragm that is pneumatically activated and deactivated for causing block holding pads to selectively engage and disengage the structural building block 525. In another embodiment, the block holding pads can be selectively engage and disengage through activation means that is electric, hydraulic or other suitable means. Preferably, but not necessarily, the block holding pads are fully or partially located within the block release recess 442 (FIG. 22). Discharge of the structural building block 525 completes the block fabrication cycle.

It is disclosed herein that a vibratory apparatus can be attached to each compression body 406 and/or to the compression case 404. In compressing media to form the structural building block 525, portions of the media engaged with each compression body 406 can sometimes have a tendency to stick to one of the engaged compression bodies 406. Attachment of a vibratory apparatus to each compression body 406 and activation of the vibratory apparatus just prior to when the engaged compression bodies 406 is moved toward its respective media loading position P2 will contribute to releasing media of the structural building block 525 from engaged compression bodies 406. In doing so, the tendency for a surface of the structural building block 525 being damaged through the act of retracting the engaged compression bodies 406 is reduced.

Additionally, it is disclosed herein that the vibratory apparatus can be activated during the media fill operation. In doing so, density of the media 510 is increased by virtue of vibrations from the vibratory apparatus causing entrapped air in the media to be released.

It is disclosed herein that only one compression body 406 need be movable (i.e., the moving compression body) for forming structural building blocks through use of the block forming apparatus 400. One compression body (i.e., the stationary compression body) can be maintained in a fixed position via a substantially rigid member such as, for example, a beam connected between a chassis bulkhead and the stationary compression body. In the case of a block forming apparatus implemented with one movable compression body and one stationary compression body, an inboard face of the media compaction portion of the face the stationary compression body is aligned with an edge of the media fill opening 421 of the frame 402 (i.e., the media fill opening 421 positioned between inboard faces of the compression bodies 406) and with an edge of the block discharge opening 420 of the frame 402 (i.e., the block discharge opening 420 positioned between inboard faces of the compression bodies 406). Such alignment allows for block in accordance with the method 500 with the exception that only one compression body 406 is moved relative to the frame 402.

Referring now to FIGS. 23-31, shown are various aspects on a block forming apparatus 600 specifically configured in accordance with an embodiment of the present invention for forming structural building blocks by depositing a prescribed activation material into a volume of block forming media having a curable binding material dispersed therein and, thereafter, compacting such block forming media. The block forming apparatus 600 includes a frame 602, a compression case 604 and two opposed compression bodies 606. As is discussed in greater detail below, the frame 602, the compression case 604 and the two opposed compression bodies 606 are configured and interoperable in a manner that enabling the block forming apparatus 600 to carry out block fabrication functionality in accordance with present invention (e.g., in accordance with the method 700 disclosed herein).

As will become apparent in the ensuing discussion, the block forming apparatus 600 advantageously has a substantially integrated construction such that can be readily implemented into a block press having a substantially modular construction (i.e., the block forming press 300 is a press of such modular construction). Alternatively, the block forming apparatus 600 can be implemented in a block press in a non-modular and/or non-interchangeable manner. Additionally, the block press apparatus 600 can be used in a block press configured for having a single block press apparatus mounted thereon at any point in time or a plurality of block press apparatuses mounted thereon at any point in time.

The frame 602 preferably, but not necessarily, includes an elongated rectangular cross-section tube having an upper wall 610, a lower wall 612 and spaced-apart side walls 614. Both spaced apart side walls 614 are not shown, but can have the same configuration as spaced-apart side walls 114, 116 shown in FIG. 1. The frame 602 includes compression case receiving passage 617 defined by interior surfaces of the walls (610-614) of the frame 602. The compression case receiving passage 617 extends between opposed end faces (618, 619) of the frame 602. A media fill opening 621 extends through the upper wall 610 of the frame 602 and a block discharge opening 620 extends through the lower wall 612 of the frame 602 such that the media fill opening 621 and the block discharge opening 620 are communicative (i.e., intersect) with the compression case receiving passage 617.

The compression case 604 is slideably engaged within the compression case receiving passage 617 of the frame 602. The slideable engagement between the frame 602 and the compression case 604 enables movement of the compression case 604 relative to the frame 602 along a longitudinal reference axis L1 of the compression case 604. In the depicted embodiment, the compression case 604 preferably, but not necessarily, includes an elongated rectangular cross-section tube having an upper wall 622, a lower wall 624 and spaced apart side walls 626. Both spaced-apart side walls 626 are not shown, but can have the same configuration as spaced-apart side walls 126, 128 shown in FIG. 1. As discussed below in greater detail, the upper wall 622 and the lower wall 624 include hollow portions for facilitating delivery of prescribed activation material and/or other types of useful functionality.

Interior surfaces of the walls (622-626) of the compression case 604 define a compression body receiving passage 630 extending between opposed end faces (632, 634) of the compression case 604 along the longitudinal reference axis L1. A media fill opening 636 extends through the upper wall 622 of the compression case 604 and a block discharge opening 638 extends through the lower wall 624 of the compression case 604. The media fill opening 636 of the compression case 604 and the block discharge opening 638 of the compression case 604 are communicative (i.e., intersect) with the compression body receiving passage 630. The respective interior surface of each one of the side walls 626 can have a respective block release recess therein, configured in a similar manner as discussed above in reference to FIGS. 15-22. These block release recesses are not shown in FIG. 15, but can be substantially the same as the block release recesses (140, 142) shown in FIG. 4.

At a minimum, the central axis of the media fill opening 636 of the compression case 604 is offset from a leading edge of the block discharge opening 638 by a distance equal to a length of the media fill opening 636 of the compression case 604. It is disclosed herein that, in an alternate embodiment of the compression case 403 (not shown), the block discharge opening 638 intersects adjacent end 634 of the compression case 604. In such an alternate embodiment, the adjacent end 634 of the compression case 604 defines a rear lateral edge 646 of the block discharge opening 638.

Preferably, dimensions of the block discharge opening 520 of the frame 452 are the same as or larger than the corresponding dimensions of the block discharge opening 538 of the compression case 504. Similarly, it is preferable that dimensions of the media fill opening 521 of the frame 502 are the same as or larger than the corresponding dimensions of the media fill opening 538 of the compression case 504.

It is disclosed herein that the frame 602 and the compression case 604 can optionally both have a different cross sectional shape than rectangular. Examples of such different cross-sectional shapes include, but are not limited to, round, hexagonal, etc. In view of the disclosures made herein, a skilled person will appreciate that the present invention is not necessarily limited to a particular cross-sectional shape of the frame 602 or the compression case 604. Additionally, a skilled person will appreciate that the frame 602 can be a non-tubular structure (e.g., an open chassis) while still providing for the required functionality of movable engagement with the compression case 604 and necessary engagement of the block forming apparatus 600 by a block press.

Figure 23:
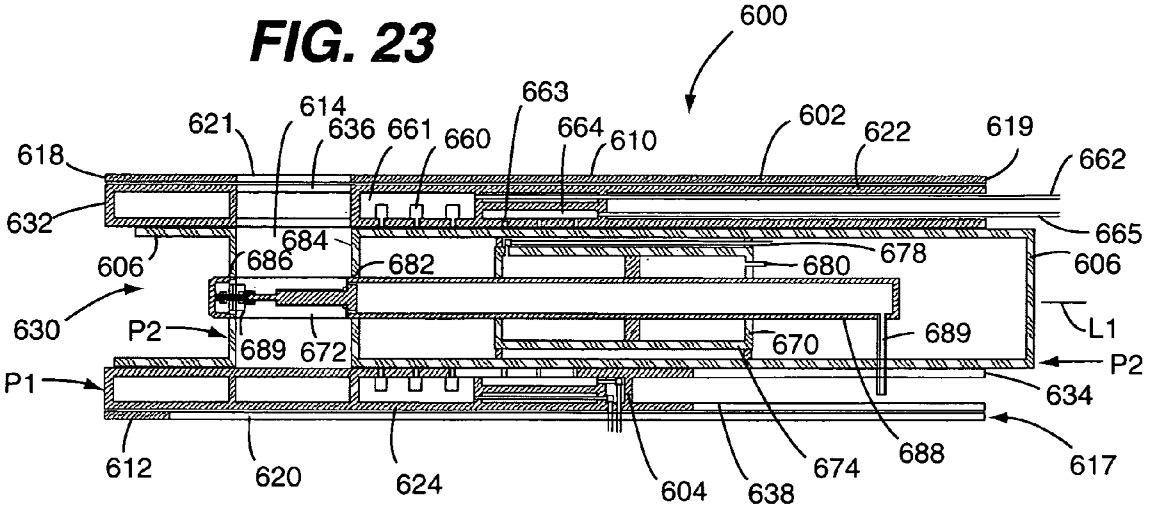
FIGS. 23-25 depict various aspects of a block forming apparatus in accordance with a third embodiment the present invention, which is configured for forming structural building blocks by compacting block forming media and curing of a curable binding material dispersed within the block forming media in combination with translation of an activation material delivery apparatus.

Still referring to FIG. 23, each compression body 606 is slideably mounted within the compression body receiving passage 630 of the compression case 604. Thus, each compression body 606 is mounted in a manner enabling movement (i.e., simultaneous, independent and/or linked) of each compression body 606 along the longitudinal reference axis L1 of the compression case 604. Similar to the compression body 106 shown in FIGS. 1, 2 and 5, each compression body 606 can include a media compaction portion and an actuator engagement portion connected to the media compaction portion. An inboard face of the media compaction portion can be substantially flat, can be partially flat with a non-flat feature or can be substantially contoured. In one embodiment the media compaction portion of each compression body can have a relatively low clearance fit (i.e., an intimate fit) within the compression body receiving passage 630 and, preferably, a length of the media compaction portion is relatively long with respect to cross-sectional dimensions of the compression body receiving passage 630 to limit a tendency for rocking within compression body receiving passage 630. The actuator engagement portion can include a generally flat engagement flange. The engagement flange enables distributed delivery of a force onto the compression body 606 through a force application means such as, for example, a force application platen connected to a hydraulic cylinder. In another embodiment, the compression bodies are integrally connected to a press beam supporting arm structure having a separate frame or rail for independent support and movement in relation to the support frame and movement of the compression case. This embodiment allows for unrestrained independent movement of the compression bodies within the compression case and the compression case independently moves in relation to the compression bodies. Actuating cylinder apply pressure to the press beam support arm structure which then translate this force to a single or multiple compression bodies being integrally part of the press beam support arm structure.

Still referring to FIG. 23, a prescribed activation material delivery mechanism 670 is provided within a first one of the compression bodies 606 for facilitating delivery of prescribed activation material to enable curing of a curable binding material. The activation material delivery mechanism 670 includes a first activation material delivery device 672 and a delivery device actuator 674. In one embodiment, the delivery device actuator 674 includes a ram and a forced fluid cylinder (e.g., hydraulic or pneumatic). The delivery device actuator 674 allows for translation of the first activation material delivery mechanism 670 with respect to the compression body 606 on which it is mounted.

The first activation material delivery device 672 is translatably connected to the delivery device actuator 674 in a manner allowing the delivery device actuator 674 to cause translation of the first activation material delivery device 672 along a delivery device translation axis extending effectively parallel with the longitudinal axis L1. For example, through application of fluid pressure at a first fluid supply line 678 and at a second fluid supply line 680 (i.e., differential applied pressure), the first activation material delivery device 672 translates in a first direction and a second (i.e., opposite) direction along the delivery device translation axis. The first activation material delivery device 672 extends through an opening 682 in a media compressing face 684 of the first one of the compression body 606. A second one of the compression bodies 606 (i.e., the opposing compression body) has a delivery device receiving opening 686 therein such that through translation of the first activation material delivery device 672 and/or the second one of the compression bodies 606, the first activation material delivery device 672 can be extended into the delivery device receiving opening 686 of the second one of the compression bodies 606.

Figure 24:
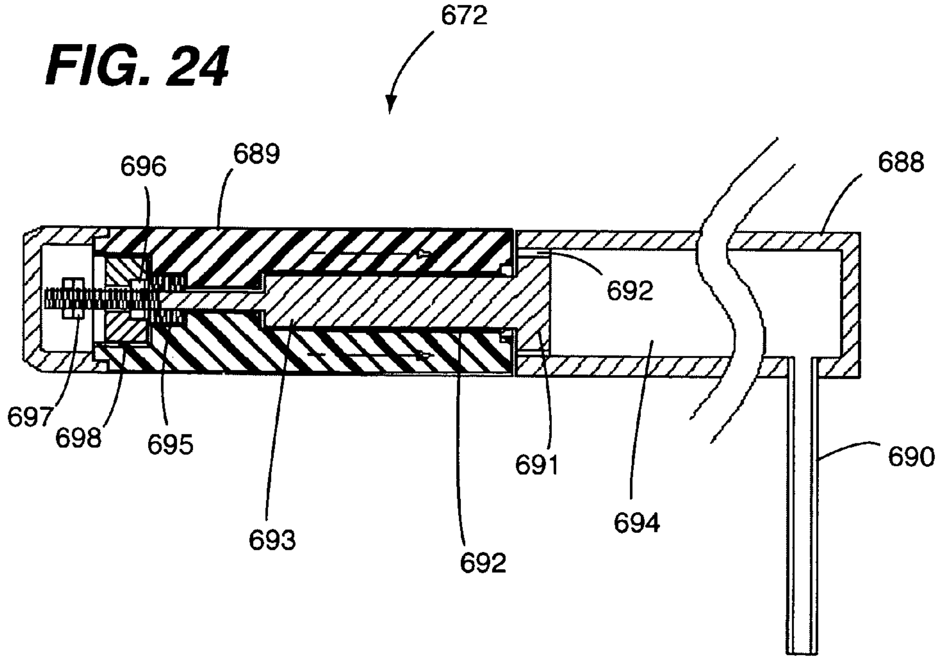
Figure 25:
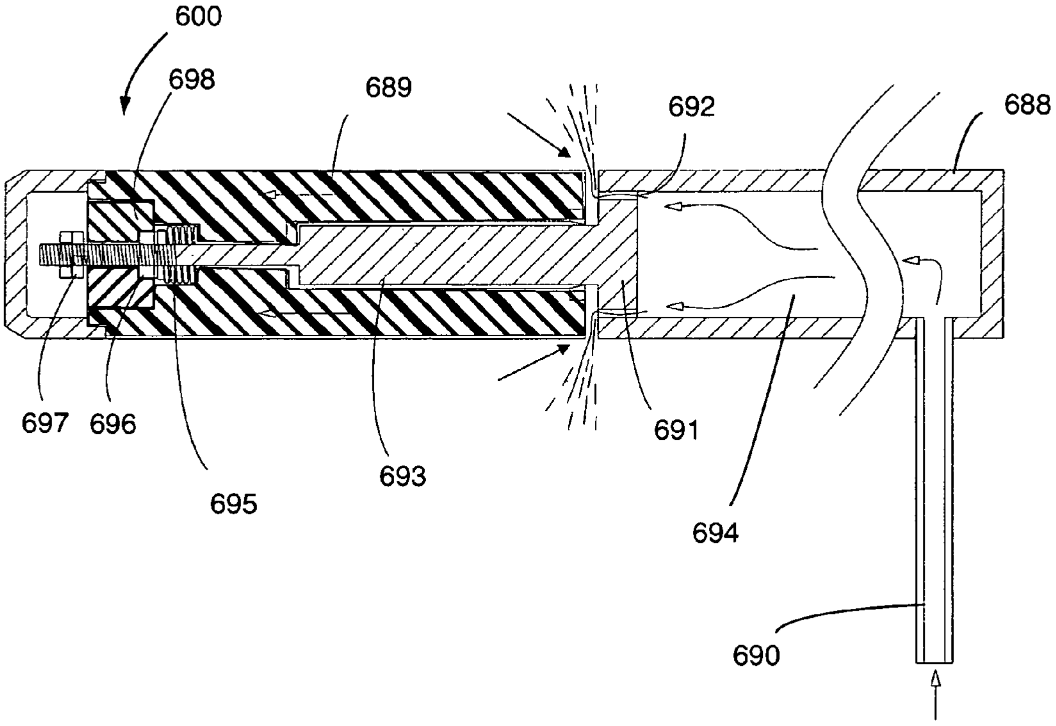

Referring now to FIGS. 15-17, the first activation material delivery device 672 comprises a delivery tube 688, a nozzle body 689 and a material delivery conduit 690. An end wall 691 of the delivery tube 688 has delivery orifices 692 extending therethrough and a delivery tube extension 693 extending therefrom. The material delivery conduit 690 intersects a fluid passage 694 of the delivery tube 688 for allowing prescribed activation material to be supplied into the delivery passage 694 through controlled translation speed of the first activation material delivery device 672. The delivery tube extension 693 extends through the nozzle body 689. The delivery tube extension 693 and the nozzle body 689 are jointly configured for allowing the nozzle body 689 to slide on (i.e., translate relative to) the delivery tube extension 693. A nozzle preload spring 695 engaged between the nozzle body 689 and a tip portion of the delivery tube extension 693 biases the nozzle body 689 to an at-rest position with respect to the delivery tube 688 (as shown in FIG. 24). In the at-rest position, a first end portion of the nozzle body 689 abuts the end wall 691 of the delivery tube 688 such that flow of prescribed activation material from within the delivery tube 688 is inhibited. Spring force exerted on the nozzle body 689 is maintained at a level such that the nozzle body 689 is maintained in the at-rest position until pressure at which the prescribed activation material is supplied into the delivery tube 688 overcomes such spring force, thereby moving the nozzle body 689 to a displaced position (as shown in FIGS. 24 and 25). In the displaced position, the first end portion of the nozzle body 689 is spaced away from the end wall of the 691 of the delivery tube 688 such that prescribed activation material from within the delivery tube 688 flows through the delivery orifices 692 and through the space between the end portion of the nozzle body 689 and the end wall of the 691 of the delivery tube 688.

A pressure adjustment nut 696 and travel adjustment nut 697 are separately threaded onto the tip portion of the delivery tube extension 693. A stop plate 698 is positioned between the pressure adjustment nut 696 and the travel adjustment nut 697. The tip portion of the delivery tube extension 693 passes through a passage in the stop plate 698 in a manner allowing the tip portion of the delivery tube extension 693 to translate with respect to the stop plate 698. The stop plate 698 includes external threads that are threadedly engaged with mating internal threads within recess within a tip portion of the nozzle body 689. The stop plate 697 includes a cavity therein configured for receiving the pressure adjustment nut 696. The stop plate 697 and the nozzle body 689 are jointly configured such that, with sufficient displacement of the nozzle body toward the displaced position, a second end face of the nozzle body engage the stop plate 698.

Through rotation of the pressure adjustment nut 696 with respect to the delivery tube extension 693, preload of the nozzle preload spring 695 can be adjusted. Such adjustment allows the fluid pressure required for moving the nozzle body 689 from the at-rest (i.e., closed) position to the displaced position (i.e., open position) to be selectively adjusted. Through rotation of the travel adjustment nut 697 with respect to the delivery tube extension 693 and/or through rotation of the stop plate 698 with respect to the nozzle body 689, overall displacement of the nozzle body 689 can be adjusted. In this manner, an opening pressure of the nozzle body 689 and a maximum displacement of the nozzle body 689 can be independently adjusted. More specifically, the space between the between the end portion of the nozzle body 689 and the end wall of the 691 of the delivery tube 688 when the nozzle body 689 is in the displaced position and fluid pressure required for achieving such displacement can be adjusted for altering deliver properties (i.e., flow rate, dispersion, etc) of the prescribed activation material delivered from the first activation material delivery device 672. Such adjustability is important because the smaller (e.g., narrower) the opening between the end portion of the nozzle body 689 and the end wall of the 691 of the delivery tube 688 for any given pressurised fluid (i.e., the prescribed activation material), the greater the velocity of the fluid. This velocity has a shearing or mixing affect on the activation material 717 and block forming media 710 that is advantageous. With controlled pressure and controlled opening size and by controlling the velocity at which the first activation material delivery device 672 moves relative to the compression body, a calculated quantity of prescribed activation material can be evenly dispersed and completely mixed throughout the block forming media. As can be seen, controlling the speed of translation of the first activation material delivery device 672 and controlling the pressure at which prescribed activation material is supplied to the first activation material delivery device 672 influences the volume and uniformity (i.e., distribution and dispersion) of the prescribed activation material.

Referring back to FIG. 23, the compression case 604 includes a plurality of second activation material delivery devices 660 (e.g., spray nozzles) exposed within openings of walls defining the compression body receiving passage 630. The second activation material delivery devices 660 are located within a first hollow portion 661 of such walls of the compression case 604. Through adequate positioning of the compression case 604 with respect to the compression bodies 606, prescribed activation material supplied to the second activation material delivery devices 660 under pressure via an activation material delivery line 662 can be delivered (e.g., injected, sprayed, etc) into the compression body receiving passage 630 between the compression bodies 606. The compression case 604 also includes a plurality of auxiliary delivery devices 663 (e.g., spray nozzles) exposed within openings of walls defining the compression body receiving passage 630. The auxiliary delivery devices 663 are located within a second hollow portion 664 of such walls of the compression case 604. Through adequate positioning of the compression case 604 with respect to the compression bodies 606, a fluid such as stream or hot water supplied to the auxiliary delivery devices 663 under pressure via an auxiliary material delivery line 665 can be delivered (e.g., injected, sprayed, etc) into the compression body receiving passage 630 between the compression bodies 606. For example, soil or flyash can require very small amounts of water to allow these materials to be joined together under pressure. Other materials can require steam curing under pressure to complete crystallisation. For example calcium silicate, and geopolymers can require steam curing after or during compression. Also, the injection of small amounts of water in the form of steam may be used in place of the reactant materials through the first or second injectors before pressing fly ash or soils, which can only require a small amount of moisture as the reactant material. The second activation material delivery devices 660 and the auxiliary delivery devices 663 can be distributed within all of the walls defining the compression body receiving passage 630 (i.e., not limited to placement in any particular ones of such walls).

It is disclosed herein that the second activation material delivery devices 660 and/or the auxiliary delivery devices 663 can each be plumbed in combination with one or more respective adjustable pressure relief valve. The adjustable pressure relief valves are fixed and set to open at a pre-determined pressure. In this manner, simultaneous opening of one or more fluid delivery devices attached to a respective pressure relief valve is provided for at the predetermined pressure.

Now, a discussion of fabrication functionality of the block forming apparatus 600 for forming a structural building block is presented. A method in accordance with the present invention, which is referred to herein as the method 700, is depicted in FIGS. 26-31. While the method 700 is depicted and discussed as being carried out in accordance with the block forming apparatus 600 depicted in FIGS. 23-31, in view of the disclosures made herein, a skilled person will appreciate that other suitably configured block forming equipment can be used for carrying out the method 700.

Figure 26:
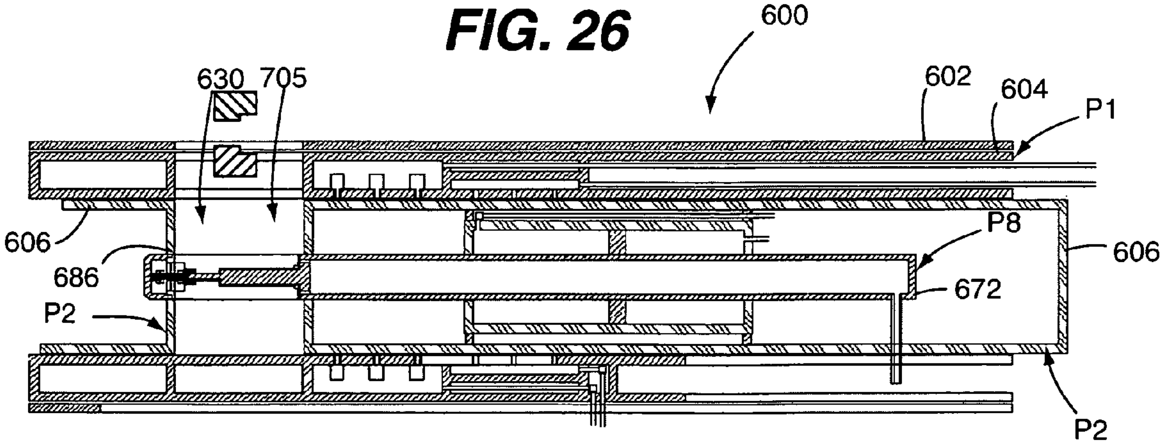
FIGS. 26-31 depict a method for fabricating a compacted and cured structural building block in accordance with an embodiment of the present invention using the block forming apparatus of FIGS. 23-25.

Referring now to FIG. 26, a block fabrication cycle begins with facilitating relative positioning of the compression case 604 and each compression body 606 for forming a media receiving cavity 705 within the compression body receiving passage 630 between the compression bodies 606 and moving the first activation material delivery device 672 such that the nozzle body 689 is positioned within the delivery device receiving opening 686 of the second one of the compression bodies 606. A quantity of release agent can be spayed onto surfaces of the compression case 604 and compression bodies 606 that contact the block forming media for allowing clean release of an as-formed structural building block from such surfaces of the compression case 604 and compression bodies 606. Relative to completion of a previously performed block fabrication cycle, facilitating such relative positioning for forming the media receiving cavity 705 includes moving the compression case 604 to a respective media loading position P1 relative to the frame 602, moving each compression body 606 to a respective media loading position P2 relative to the compression case 604, and moving the first activation material delivery device 672 to an extended position P8. In this configuration, the compression bodies 606 are in spaced apart relationship with respect to each other, and a tip portion of the first activation material delivery device 672 is positioned within the delivery device receiving opening 686 of the opposing compression body 606 (i.e., through translation with respect to the delivery device actuator 674). Accordingly, with the compression case 604 in its respective media loading position P1 and each compression body 606 in its respective media loading position P2, the media receiving cavity 705 is provided within the compression body receiving passage 630 between the two compression bodies 606.

In the case of gravity feed of the block forming media where the compression case 604 serves as the block forming media shut-off structure for an associated media hopper/media supply, the first activation material delivery device 672 must be in an extended position (i.e., extending through the delivery device receiving opening 686 of the opposing compression body 606) prior to block forming media entering the media receiving cavity 705. For example, the first activation material delivery device 672 can be moved to the extended position immediately following ejection of a formed block from a prior block fabrication cycle. In the case of unrestricted gravity feeding of block forming media from a hopper into the media receiving cavity 705, vibratory means or the like can be employed for causing complete fill of the media receiving cavity as defined between the compression when the media receiving cavity 705 are a prescribed distance apart from each other (i.e., defining a media receiving cavity 705 of a prescribed quantity.

Figure 27:
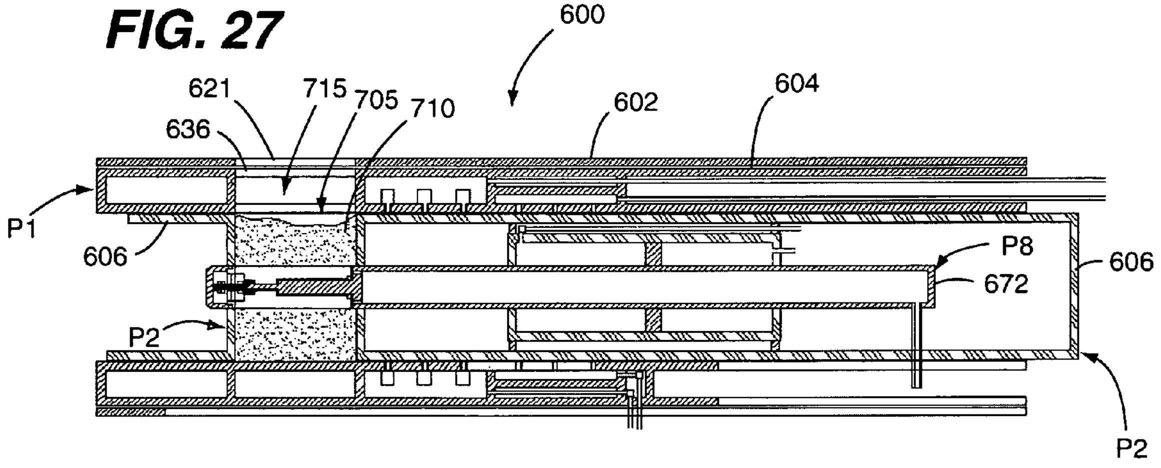

As depicted in FIG. 27, a quantity of block forming media 710 from which a building block can be made is deposited into the media receiving cavity 705 through an opening 715 defined by the media fill openings (619, 636) of the frame 602 and the compression case 604 after relative positioning of the compression case 604 and each two compression body 606 is performed for forming the media receiving cavity 705. The block forming media 710 includes a curable binding material dispersed therein. Curing of the curable binding material is caused by contact with a prescribed activation material.

It is disclosed herein that the quantity of media 710 will preferably be of a relatively low density with respect to the density of media in corresponding formed structural building block. In the case of the quantity of block forming media being controlled by a delivery hopper, there are a number of approaches for such hopper controlling such delivered quantity of block forming media. In one such approach, the quantity of the media 710 delivered to the media receiving cavity 705 is quantitatively determined prior to or in conjunction with the quantity of media 710 being deposited in the media receiving cavity 705. In another such approach, a length of deposit time is correlated to the quantity of media 710. In still another such approach, a weight is correlated to the quantity of media 710. In still another such approach, a fill level of media within the media receiving cavity 705 is determined in conjunction with delivery of the quantity of media 710. In the case of the quantity of block forming media being controlled by size of the media receiving cavity 705 and media delivery to the media receiving cavity 705 being unrestricted, one preferred approach to delivering the block forming media is to position the compression bodies 606 a prescribed distance apart such that a media receiving cavity 705 of a prescribed quantity is defined and using means such as a vibratory device to assure that this prescribed quantity is sufficiently filled with block forming media.

Figure 28:
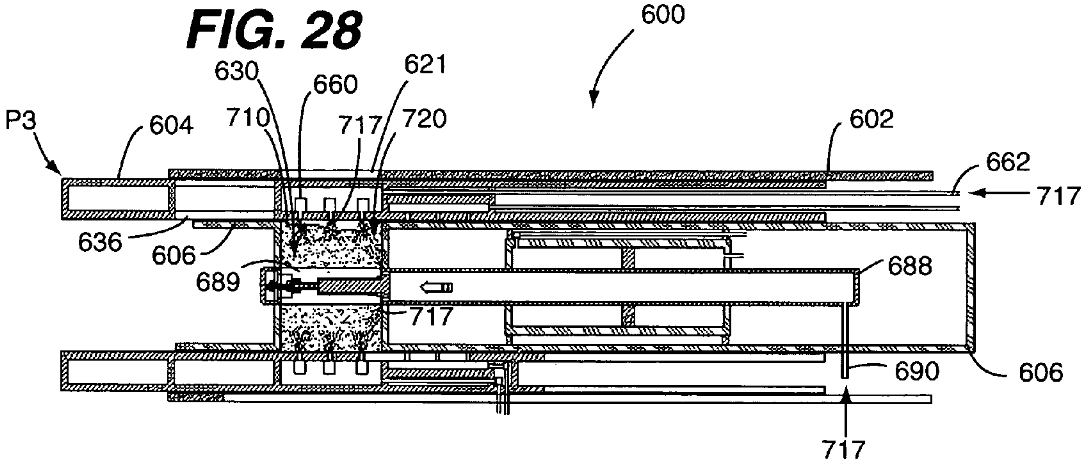
Figure 29:
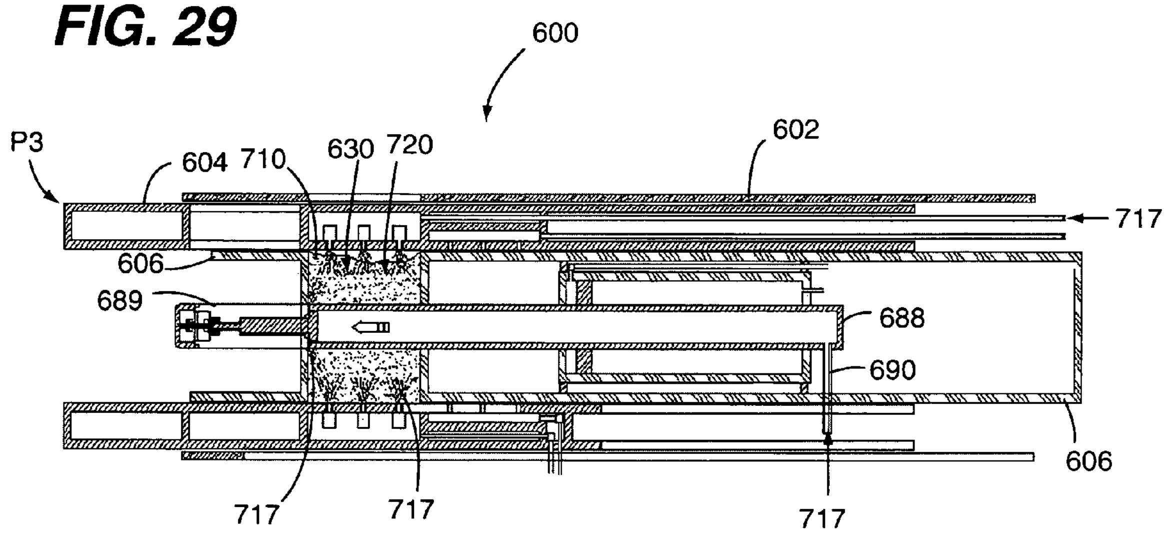

As depicted in FIGS. 28 and 29, after the quantity of block forming media 710 is deposited within the media receiving cavity 705, relative positioning of the compression case 604 is facilitated for closing the entry 715 into the media receiving cavity 705 through which the quantity of media 710 was deposited. Facilitating relative positioning of the compression case 604 for closing the entry 715 includes moving the compression case 604 to a chamber sealing position P3 relative to the media fill opening 621 of the frame 602. In the chamber sealing position P3, the media fill opening 636 of the compression case 604 is entirely offset from the media fill opening 621 of the frame 602. Upon closing of the entry 715, the space within the compression body receiving passage 630 between the two compression bodies 606 becomes a media compression chamber 720 (i.e., a generally sealed chamber).

After positioning the compression case 604 for forming the media compression chamber 720, a quantity of the prescribed activation material 717 is injected (i.e., deposited) under pressure into the media compression chamber 720. More specifically, the quantity of media 710 at least partially covers the first activation material delivery device 672 such that at least a portion of the prescribed activation material 717 is injected into the quantity of media 510 via the first activation material delivery device 672. Furthermore, the prescribed activation material 717 is injected under high pressure whereby such high pressure results in a force being applied on the nozzle body 689 thereby causing translation of the nozzle body 689 with respect to the delivery tube 688 from the at-rest position (See FIG. 24) to the displaced position (see FIG. 25) and, thus, allowing flow of the prescribed activation material 717 into the media compression chamber 720. Spring biasing force from exerted on the nozzle body 689 causes the nozzle body 689 to translate back to the at-rest position from the displaced position upon completion of the prescribed activation material being supplied to the activation material delivery device 672 under sufficiently high pressure.

Still referring to FIGS. 28 and 29, it can be seen that during delivery of the prescribed activation material 717 from the first activation material delivery device 672, the first activation material delivery device 672 is translated through the media receiving cavity 705 such that prescribed activation material 717 is dispersed and distributed throughout the quantity of block forming media 710. As such, the first activation material delivery device 672 sprays prescribed activation material 717 in a 360 degree radius with respect to a translation axis of the first activation material delivery device 672, spraying from a central region of the media receiving cavity 705 toward an outer region of the media receiving cavity 705. Furthermore, it can be seen that prescribed activation material 717 is also delivered into the media receiving cavity 705 via the second activation material delivery devices 660. Such delivery from the second activation material delivery devices 660 can be performed simultaneously with delivery of prescribed activation material 717 from the first activation material delivery device 672, partially with the delivery of prescribed activation material 717 from the first activation material delivery device 672 and completely separate from delivery of prescribed activation material 717 from the first activation material delivery device 672. The second activation material delivery devices 660 can be configured to provide different spray patterns. This allows for greater control of placement of the prescribed activation material 717 reaching areas where the prescribed activation material 717 from the first second activation material delivery devices 672 does not reach. In view of the disclosures made herein, a skilled person will appreciate a plurality of first activation material delivery devices 672 (e.g., fed by a common manifold or separate manifolds) can be implemented rather than a single one.

Accordingly, it can be seen that the first activation material delivery device 672 sprays prescribed activation material 717 towards the second activation material delivery devices 660 and, similarly, the second activation material delivery devices 660 spray prescribed activation material towards the first activation material delivery devices 672. Such spraying is performed at predetermined pressure such that a mixing process (i.e., agitation) takes place between the curable binding material in the block forming media 710 and the prescribed activation material 717. This mixing coupled with the displacement of the first activation material delivery device 672 provides for relatively uniform depositing of the curable binding material in the block forming media 710 and the prescribed activation material 717.

It is disclosed herein that a single second activation material delivery device 660 can be provided in the compression case 604 as opposed to a plurality of second activation material delivery devices 660. In such an alternate embodiment, the compression case translates in a similar manner as does the first activation material delivery devices 672. Such translation of the second activation material delivery device 660 through translation of the compression case 604 provides for distribution and dispersion of prescribed activation material 717 from the second activation material delivery device 660, much in the same way as distribution and dispersion of prescribed activation material 717 from the first activation material delivery device 660 is provided.

Preferably, depositing (e.g., injecting) the prescribed activation material 717 includes delivering the prescribed activation material 717 to the activation material delivery device 472 at a pressure that causes the prescribed activation material 717 to be sprayed from the activation material delivery devices 672, 660 at high speed and/or with a high degree of exhibited turbulence. More specifically, it is preferred for the prescribed activation material 717 to be injected in a manner that causes it to be widely dispersed throughout the quantity of media 710. Orifices/delivery passages of the activation material delivery devices 672, 660 can be specifically configured to enhance such velocity, turbulence and/or dispersion. For example, such orifices/delivery passages can be specifically configured for enhancing velocity and droplet size (e.g., atomisation) of the prescribed activation material 717 as delivered to the quantity of media 710. Turbulence can also be imparted by selection of a curable binding material and corresponding activation material that together react in a turbulent manner (e.g., bubbling, foaming, etc). Such binding material induced turbulence can be at least partially controlled/mitigated through compressions exerted on the block forming media by the compression bodies 606. The amount of the prescribed activation material 717 can be dictated by an amount of time such injection is performed or by a quantity of the prescribed activation material 717 that is delivered.

Figure 30:
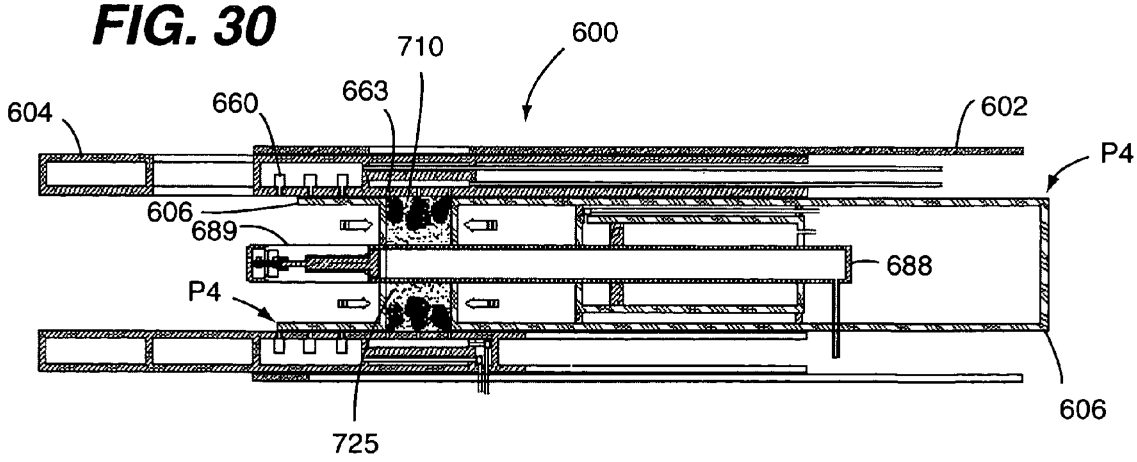

As shown in FIG. 30, following delivery of the intended quantity of the prescribed activation material, the first activation material delivery device 672 is positioned such that the interface between the nozzle body 689 and the delivery tube 688 is outside of the media compression chamber 720. More specifically, the interface between the nozzle body 689 and the delivery tube 688 is beyond a compression face of the compression body 606 opposite the compression body 606 that carries the first activation material delivery device 672. Furthermore, the compression case 604 is translated such that the second activation material delivery devices 660 are fully offset from the media compression chamber 720, thereby preventing activation material-laden block forming media 710 from entering the openings in which the second activation media delivery devices 660 are exposed and clogging the second activation media delivery devices 660 during compaction of the activation material-laden block forming media 710.

Still referring to FIG. 30, during or after injection of the prescribed activation material 717, each compression body 606 is moved toward the other compression body 606 under sufficient applied force to compress the quantity of block forming media 710 into a structural building block 725. In the depicted embodiment, the auxiliary delivery devices 663 deliver steam and/or hot water to aid in catalytic process between the activation material 717 and the curable binding material in the block forming media 710. Alternatively, the auxiliary delivery devices 663 can be omitted and, optionally, the hollow wall space in which the auxiliary delivery devices 663 were located can be used for receiving a refrigerant/cooling material for controlling temperature of the block forming media after the activation material is added thereto.

A compressed quantity and shape of the structural building block 725 corresponds to the cross sectional shape and cross-sectional area of the compression body receiving passage 630 and a distance between the inboard faces (i.e., media engaging face) of each compression body 606 when each compression body 606 is in a fully displaced position P4 (i.e., as dictated by a maximum applied pressure, a defined travel limit, or the like). In one embodiment of the present invention, longitudinal displacement of each compression body 606 is determined for enabling assessment of a degree of compaction of the quantity of media 610 and/or for enabling assessment of physical dimensions of the structural building block 725. Mechanical means (i.e., limit stops) for maintaining a minimum distance between the compression bodies 606 can be provided.

Figure 31:
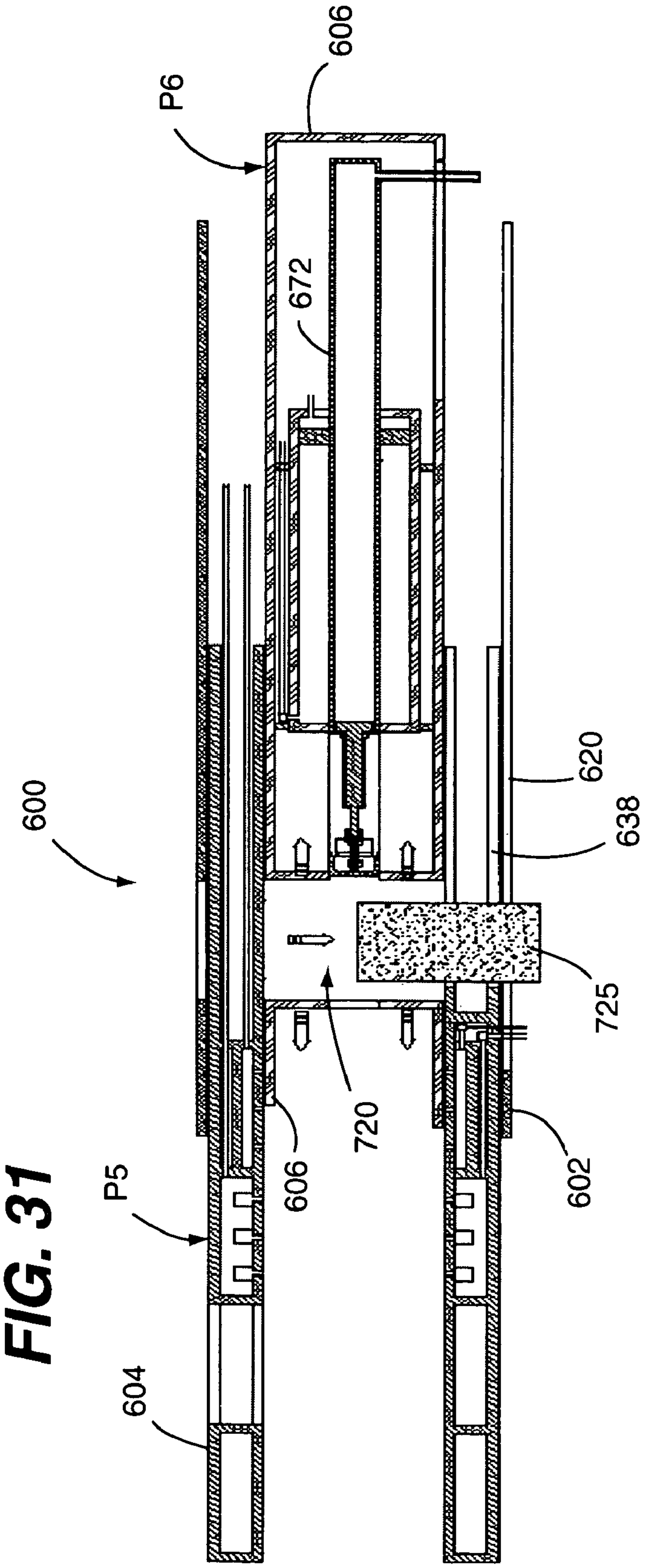

Referring now to FIG. 31, after the quantity of media 710 is compressed into the structural building block 725 and, optionally, after a prescribed curing time for the curable binding material has elapsed (e.g., after the curable binding material has cured to a specified or approximated degree such as a gel or crystallized state), relative positioning of the compression case 604 and the compression bodies 606 and retraction of the first activation material delivery device 672 is facilitated for enabling discharge of the structural building block 725 from within the compression chamber 720 through the block discharge openings 620 of the frame 602 and through the block discharge opening 638 of the compression case 604. Facilitating relative positioning for enabling such discharge includes moving the compression case 604 to a block discharging position P5 with respect to the compression bodies 606 and removing all or a portion of the applied force on the compression bodies 606 whereby the compression bodies 606 are in substantially non-compressing engagement with the structural building block 725. The operation of removing all or a portion of the applied force on the compression bodies 606 by the compression bodies 606 reduces the potential for pressure exerted by the compression bodies 606 resulting in damage to the structural building block 725 as the compression case 604 is moved from the chamber sealing position P3 to the block discharging position P5. Moving the compression case 604 to the block discharging position P5 includes limiting longitudinal movement of the compression bodies 606 while moving the compression case 604 to the block discharging position P5.

As shown in FIG. 31, with the compression case 604 in the block discharging position P5 and the activation material delivery device 672 moved to its retracted position P6, the compression bodies 606 are moved toward the respective media loading position P2 (FIG. 26). Moving the compression bodies 606 toward their respective media loading position P2 disengages the compression bodies 606 from the structural building block 725. This disengagement in conjunction with structural building block 725 being exposed to the block release recesses of the compression case 604 promotes discharging of the structural building block 725 from within the compression body receiving passage 630 of the compression case 604. It is disclosed herein that any number of means can be implemented for holding the structural building block 725 in place while the compression bodies 606 are being disengaged. A suitable configured inflatable diaphragm coupled to the compression case 604 or other suitable structure is one example of such means.

It is disclosed herein that only one compression body 606 need be movable (i.e., the moving compression body) for forming structural building blocks through use of the block forming apparatus 600. One compression body (i.e., the stationary compression body) can be maintained in a fixed position via a substantially rigid member such as, for example, a beam connected between a chassis bulkhead and the stationary compression body. In the case of a block forming apparatus implemented with one movable compression body and one stationary compression body, an inboard face of the media compaction portion of the face the stationary compression body is aligned with an edge of the media fill opening 621 of the frame 602 (i.e., the media fill opening 621 positioned between inboard faces of the compression bodies 606) and with an edge of the block discharge opening 620 of the frame 602 (i.e., the block discharge opening 620 positioned between inboard faces of the compression bodies 606). Such alignment allows for block in accordance with the method 700 with the exception that only one compression body 606 is moved relative to the frame 602.

A skilled person will appreciate that the present invention is not unnecessarily limited to a particular curable binding material or activation material. Functionally, a curable binding material in accordance with the present invention preferably will bind to all or a portion of other constituent materials of the block forming media, will exhibit preferred mechanical/physical properties over a relatively long-term, will be partially or fully curable within a desired duration of time after being exposed to a suitable activation material, and/or will exhibit a turbulent (i.e., physically active) reaction when chemically subjected to a corresponding catalyst.

One preferred example of a rapid setting curable binding material and corresponding activation material is a metal oxide (e.g., magnesium oxide) and an acid solution (e.g., phosphoric acid), respectively. Together, such a rapid setting curable binding material and corresponding activation material are referred to herein as a rapid set matrix composition. Another example of such a rapid set matrix composition includes a rapid set geo-polymeric matrix composition, which are formed through a chemical reaction between silicoaluminates and alkali silicates in contact with highly alkaline solutions or compounds. Examples of silicoaluminates include, but are not limited to, mineral powders, fly-ash and metakaolin. Examples of alkaline solutions include, but are not limited to, hydroxide, silicate, or a combination thereof, as well as potassium chloride and calcium chloride.

As can be seen, the present invention advantageously capitalizes on the reactive properties of rapid setting curable binding material and corresponding activation material. Furthermore, the present invention advantageously overcomes difficulties of working with very rapid setting or hardening of rapid set matrix compositions. For example, by catalysing such materials within the block-forming cavity of a block press, time considerations of forming a block with such rapid set matrix compositions is fully or sufficiently mitigated. Furthermore, such time considerations (e.g., cure time of a rapid set matrix composition) can be at least partially influenced through use of additives that retard the setting and/or hardening time of rapid set matrix composition. Such additives are well known in the art. Preferably, rapid set matrix composition useful with embodiments of the present invention undergo a chemical reaction such that the rapid set matrix composition begin to set or harden almost instantly or within seconds after contact between the rapid setting curable binding material and corresponding activation material. Accordingly, embodiments of the present invention take advantage of these rapid chemical reacting materials when molding such rapid set matrix compositions into an article (e.g., a structural building block).

In view of the block fabrication cycle shown in FIGS. 18-22 and/or the block fabrication cycle shown in FIGS. 26-31, it can be seen that bringing a rapid setting curable binding material and corresponding activation material into contact with each other within an article-forming cavity (e.g., block forming cavity) filled with a block forming media and timing compression of such block forming media and rapid setting curable binding material/activation material is important for any number of reasons. One reason is that, for materials configured for very rapid setting or hardening, after contact is made and just before setting or hardening, these materials can take on a viscoelastic-like consistency or a paste-like consistency. In reactant materials designed for rapid setting, the time that the viscoelastic or paste like consistency is present is very short. It is in this viscoelastic and/or paste-like state that the reactant materials have the characteristics to bind to block forming media with which they are in contact. Accordingly, timing of the compression stage is important in that, after or during contact between the rapid setting curable binding material and corresponding activation material, compression takes place to disperse the paste-like rapid set matrix composition throughout the block forming media, thereby intermingling with constituent components of the block forming media. In this manner, a more complete reaction between the rapid setting curable binding material and corresponding activation material takes place as these materials are dispersed by compressive forces of the compressing operation.

A skilled person will appreciate that the present invention is not unnecessarily limited to a particular form in which the curable binding material, catalyst and/or corresponding activation material are provided. In one embodiment, the curable binding material is a dry constituent component of the block forming media (i.e., dispersed therein) and the activation material is a liquid catalyst injected into contact with the curable binding material via an activation material delivery device in accordance with the present invention. In another embodiment, the curable binding material is a dry constituent component of the block forming media (i.e., dispersed therein), a catalyst for the curable binding material is also a dry constituent component of the block forming media (i.e., dispersed therein), and the activation material is also a liquid (e.g., water) injected into contact with the curable binding material and catalyst via an activation material delivery device in accordance with the present invention. In still another embodiment, the catalyst is a dry or wet constituent component of the block forming media (i.e., dispersed therein) and the curable binding agent is a liquid injected into contact with the catalyst via an activation material delivery device in accordance with the present invention. It is also disclosed herein that the activation material (e.g., the catalyst or water) can be heated to a temperature that accelerates curing of the curable binding agent or can be chilled to a temperature that slows curing of the curable binding material. For example, in the situation where the activation material is water, the water can be in the form of chilled water, heated water or steam. Similarly, other types of activation materials (i.e., including chemical catalysts such as acid solutions) can be heated or chilled as desired or required to control the rate of curing of the curable binding material.

It is disclosed herein that an expandable composition (e.g., a foaming agent) can be used to ensure intended volume and formation of structural building blocks formed in accordance with embodiments of the present invention. In one particular embodiment, a quantity of block forming media deposited into a media compression chamber of a block press configured in accordance with the present invention is less than that required to fill the media compression chamber such that it can not be compressed when bringing the compression bodies together to a predefined separation during compression of the block forming media. The expandable composition is within the block forming media or the activation material. When combined with a suitable catalyst (i.e., within the or the activation material or block forming media, respectively) during or after the compression bodies are brought together to the predefined separation, the expandable composition expands so as to fill any space within the media compression chamber that is not filled by block forming media.

In the preceding detailed description, reference has been made to the accompanying drawings that form a part hereof, and in which are shown by way of illustration specific embodiments in which the present invention can be practiced. These embodiments, and certain variants thereof, have been described in sufficient detail to enable those skilled in the art to practice embodiments of the present invention. It is to be understood that other suitable embodiments can be utilized and that logical, mechanical, chemical and electrical changes can be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:

depositing a quantity of article-forming media within a media receiving cavity of article forming equipment, wherein the article forming equipment includes a compression case and two compression bodies slideably disposed within a compression body receiving passage of the compression body, wherein the media receiving cavity is jointly formed by a media compressing face of each one of said compression bodies and walls of the compression case defining the compression body receiving passage; and depositing a volume of a prescribed fluid into the media receiving cavity after depositing at least a portion of said article-forming media within the media receiving cavity, wherein depositing the prescribed fluid includes providing a fluid delivery mechanism within a first one of said compression bodies and extending a first fluid delivery device of the fluid delivery mechanism through a delivery device receiving opening within the media compressing face of the first one of said compression bodies and into a delivery device receiving opening within the media compressing face of a second one of said compression bodies and wherein the first fluid delivery device has a substantially straight longitudinal axis extending substantially parallel with a longitudinal axis of the compression body receiving passage, and wherein depositing the prescribed fluid includes moving the first fluid delivery device through the quantity of said article-forming media while injecting the prescribed fluid through the first fluid delivery device into the quantity of said article-forming media.

2. The method of claim 1 wherein:

the first fluid delivery device includes a tube having a delivery orifice integral therewith;

the delivery orifice of the first fluid delivery device is within the media receiving cavity during said depositing of the prescribed fluid;

depositing the prescribed fluid into the media receiving cavity includes translating the tube through the media receiving cavity for causing the delivery orifice to translate through the media receiving cavity; and the quantity of said article-forming media at least partially covers the tube.

3. The method of claim 2 wherein:

the volume of block forming media is substantially devoid of the prescribed activation material during said depositing of the volume of block-forming media;

the first fluid delivery device extends through said compression bodies;

a second fluid delivery device is expose within an opening in a wall of the compression case; and depositing the prescribed fluid into the media receiving cavity further includes injecting a portion of the prescribed fluid through the second fluid delivery device into the media receiving cavity.

4. The method of claim 3 wherein, the quantity of said article-forming media at least partially covers the opening in the wall of the compression case;

the second fluid delivery device includes a delivery orifice situated for spraying a portion of the prescribed fluid through the opening into the media receiving cavity;

depositing the prescribed fluid into the media receiving cavity includes translating the compression case while spraying the portion of the prescribed fluid from the second fluid delivery device; and at least a portion of the prescribed fluid deposited via the first fluid delivery device is deposited simultaneously with the portion of the prescribed fluid deposited via the second fluid delivery device.

5. The method of claim 2, further comprising:

removing the delivery orifice from within the media receiving cavity after said depositing of the prescribed fluid is completed, wherein said removing includes translating the tube such that the delivery orifice is outside of the media receiving cavity and such that a non-orifice portion of the first fluid delivery device remains within the delivery device receiving opening of each one of said compression bodies.

6. The method of claim 5 wherein:

the first fluid delivery device includes a delivery orifice shut-off structure that is movable between an at-rest position in which flow of the prescribed fluid is inhibited and a displaced position in which flow of the prescribed fluid is allowed; and said injecting causes the delivery orifice shut-off structure to move from the at rest position to the displaced position.

7. The method of claim 5, further comprising:

compressing said article-forming media within the media receiving cavity, wherein said compressing is initiated after said depositing of the prescribed fluid is completed, wherein the non-orifice portion of the first fluid material delivery device remains within the delivery device receiving opening of each one of said compression bodies during said compressing.

8. The method of claim 7, further comprising:

retracting the first fluid delivery device from within the media receiving cavity in accordance with a timeframe selected from the group consisting of during said compressing and after said compressing is completed.

9. The method of claim 1 wherein:

said article-forming media includes a curable binding material dispersed therein; and curing of the curable binding material is carried out in accordance with a requirement selected from the group consisting of curing of the curable binding material being initiated by contact with the prescribed fluid and curing of the curable binding material being caused by contact with the prescribed fluid.

10. The method of claim 9, further comprising:

compressing said article-forming media within the media receiving cavity; and retracting the first fluid delivery device from within the media receiving cavity;

wherein said compressing is performed in accordance with a timeframe selected from the group consisting of during depositing of the prescribed fluid and after depositing of the prescribed fluid is completed;

wherein injecting the prescribed fluid causes the curable binding material to undergo a curing reaction; and wherein said retracting is initiated after a prescribed degree of the curing reaction is completed.

11. The method of claim 10 wherein the prescribed degree of the curing reaction is less than a full degree of the curing reaction.

12. A method of forming building blocks, comprising:

performing relative positioning of a compression case and two opposed compression bodies movably mounted within a compression body receiving passage of the compression case for forming a media receiving cavity within the compression body receiving passage between a media compressing face of said compression bodies;

depositing a quantity of block-forming media within the media receiving cavity, wherein said block-forming media includes a curable binding material dispersed therein, wherein curing of the curable binding material is caused by contact with a prescribed activation material and wherein the volume of block forming media is substantially devoid of the prescribed activation material during said depositing of the volume of block-forming media;

performing relative positioning of the compression case for closing an entry into the media receiving cavity through which the quantity of block-forming media was deposited after the quantity of block-forming media is deposited within the media receiving cavity;

depositing a quantity of the prescribed activation material into the media receiving cavity, wherein depositing the prescribed activation material includes providing an activation material delivery mechanism within a first one of said compression bodies and extending a first activation material delivery device of the activation material delivery mechanism through a delivery device receiving opening within the media compressing face of the first one of said compression bodies and into a delivery device receiving opening within the media compressing face of a second one of said compression bodies, wherein the first activation material delivery device has a substantially straight longitudinal axis extending substantially parallel with a longitudinal axis of the compression body receiving passage, and wherein depositing of the prescribed activation material includes moving the first activation material delivery device through the quantity of said block-forming media while injecting the prescribed activation material through the first activation material delivery device into the quantity of said block-forming media; and moving at least one of said compression bodies toward the other one of said compression bodies under sufficient force to compress said block-forming media into a building block, wherein said moving is initiated in accordance with a timeframe selected from the group consisting of during depositing of the prescribed activation material and upon completion of depositing the prescribed activation material and wherein the first activation material delivery device remains within the delivery device receiving opening of each one of said compression bodies during said moving.

13. The method of claim 12 wherein:

the first activation material delivery device includes a tube having a delivery orifice integral therewith;

the tube extends through said opposed compression bodies;

the delivery orifice is within the media receiving cavity during said depositing of the prescribed activation material;

depositing the prescribed activation material into the media receiving cavity includes translating the tube through the media receiving cavity for causing the delivery orifice to translate through the media receiving cavity; and the quantity of said block-forming media at least partially covers the tube.

14. The method of claim 13 wherein depositing the prescribed activation material into the media receiving cavity further includes injecting a portion of the prescribed activation material through a second activation material delivery device expose within an opening in a wall of the compression case.

15. The method of claim 13, further comprising:

removing the delivery orifice from within the media receiving cavity after said depositing of the prescribed activation material is completed, wherein said removing includes translating the tube such that the delivery orifice is outside of the media receiving cavity and such that a non-orifice portion of the first fluid delivery device remains within the delivery device receiving opening of each one of said compression bodies.

16. The method of claim 15 wherein:

the first activation material delivery device includes a delivery orifice shut-off structure that is movable between an at-rest position in which flow of the prescribed activation material is inhibited and a displaced position in which flow of the prescribed activation material is allowed; and said injecting causes the delivery orifice shut-off structure to move from the at rest position to the displaced position.

17. The method of claim 16 wherein said performing relative positioning for forming the media receiving cavity includes:

moving the compression case to a respective media loading position relative to a frame on which the compression case is movably mounted;

moving at least one of said two opposed compression bodies to a respective media loading position relative to the compression case whereby the media receiving cavity is provided within the compression body receiving passage between said compression bodies; and positioning an activation material delivery device within the compression body receiving passage.

* * * * *